US011643836B2

(12) United States Patent
Danaczko

(10) Patent No.: US 11,643,836 B2
(45) Date of Patent: May 9, 2023

(54) MONOLITHIC TOWERS HAVING SUPPORT STRUCTURES, AND METHOD OF DESIGNING AND ASSEMBLING THE SAME

(71) Applicant: Mark A. Danaczko, Houston, TX (US)

(72) Inventor: Mark A. Danaczko, Houston, TX (US)

( * ) Notice: Subject to any disclaimer, the term of this patent is extended or adjusted under 35 U.S.C. 154(b) by 0 days.

(21) Appl. No.: 17/575,114

(22) Filed: Jan. 13, 2022

(65) Prior Publication Data

US 2022/0228394 A1 Jul. 21, 2022

Related U.S. Application Data

(60) Provisional application No. 63/140,227, filed on Jan. 21, 2021.

(51) Int. Cl.
*E04H 12/20* (2006.01)
*E02D 27/42* (2006.01)
*F03D 13/20* (2016.01)

(52) U.S. Cl.
CPC ........... *E04H 12/20* (2013.01); *E02D 27/425* (2013.01); *F03D 13/22* (2016.05)

(58) Field of Classification Search
CPC .......... F03D 13/20; F03D 13/10; F03D 13/22; E04H 12/20; E02D 27/425
See application file for complete search history.

(56) References Cited

U.S. PATENT DOCUMENTS

| | | | |
|---|---|---|---|
| 5,002,252 A * | 3/1991 | Setala | A47G 33/12 248/533 |
| 5,072,555 A | 12/1991 | Geiger | |
| 7,276,808 B2 | 10/2007 | Weitkamp et al. | |
| 7,508,088 B2 | 3/2009 | Kothnur et al. | |
| 7,739,843 B2 | 6/2010 | Cortina-Cordero | |
| 7,993,107 B2 * | 8/2011 | Gevers | F03D 13/20 248/163.1 |
| 8,245,458 B2 * | 8/2012 | Johnson | F03D 13/20 52/651.01 |
| 8,258,646 B2 * | 9/2012 | Oosterling | E02D 27/425 290/55 |
| 8,307,593 B2 | 11/2012 | Bagepalli | |
| 8,322,093 B2 | 12/2012 | Zavitz et al. | |
| 8,955,274 B2 * | 2/2015 | Brandao | E04H 12/10 52/223.14 |
| 9,617,752 B2 * | 4/2017 | Wagner | E02D 27/425 |
| 10,001,111 B2 | 6/2018 | Patberg et al. | |
| 10,041,269 B2 | 8/2018 | Gremling | |
| 10,392,233 B2 | 8/2019 | Mayer et al. | |

(Continued)

FOREIGN PATENT DOCUMENTS

WO 2019/219448 A1 11/2019

*Primary Examiner* — Andrew J Triggs
(74) *Attorney, Agent, or Firm* — Bridgeway IP Law Group, PLLC; Hyun Woo Shin; Sang Ho Lee

(57) ABSTRACT

Provided is a composite tower structure and a method of designing and assembling the same, the composite tower structure including: a tower body, a foundation to which a bottom end of the tower body is fixed, a plurality of vertical supports disposed around a perimeter of the tower body, and a support structure connecting a top end of each of the plurality of vertical supports to the tower body. The composite tower structure may further include one or more intermediate guide structure(s) connected to the tower body and supporting a middle portion of the plurality of vertical supports.

13 Claims, 17 Drawing Sheets

(56) References Cited

U.S. PATENT DOCUMENTS

| | | |
|---|---|---|
| 10,451,043 B2 | 10/2019 | V et al. |
| 10,465,660 B2 * | 11/2019 | Agassi .................... E02D 27/10 |
| 10,640,995 B2 | 5/2020 | Phuly et al. |
| 10,823,150 B2 | 11/2020 | Wang et al. |
| 11,136,780 B2 * | 10/2021 | Kersten ................... E04H 12/12 |
| 2010/0132269 A1 * | 6/2010 | Bagepalli ................ E04H 12/08 |
| | | 52/651.01 |
| 2016/0258421 A1 | 9/2016 | Agassi |
| 2017/0058549 A1 * | 3/2017 | Stiesdal ................... E04H 12/08 |
| 2020/0032775 A1 * | 1/2020 | Agassi .................... F03D 13/35 |

\* cited by examiner

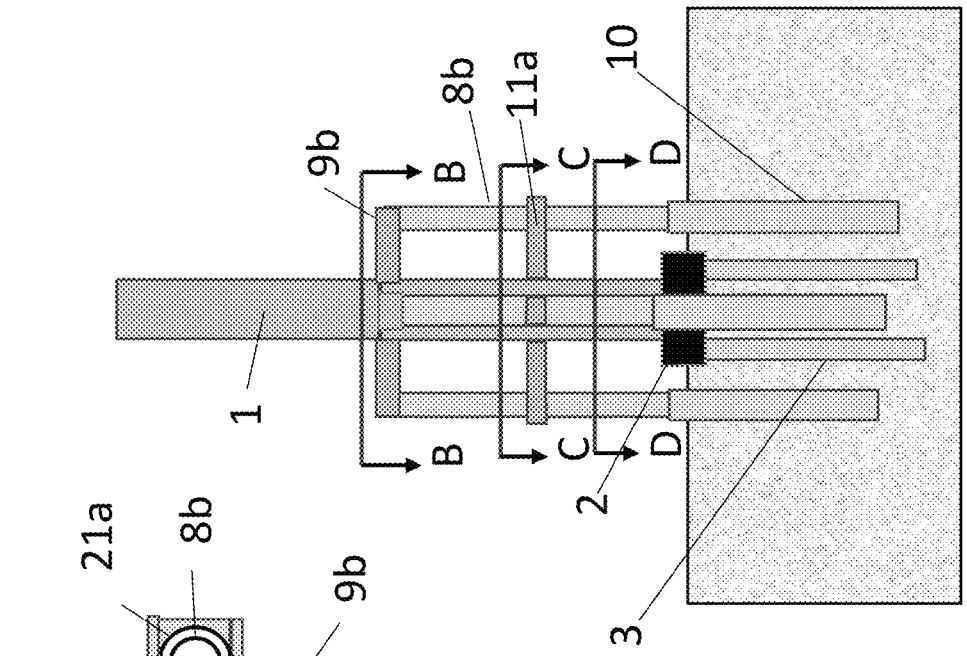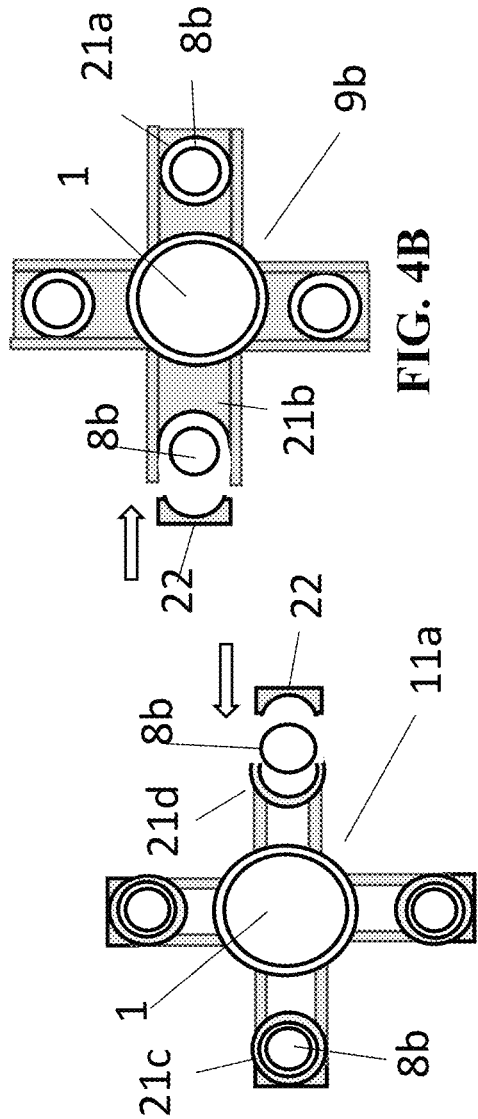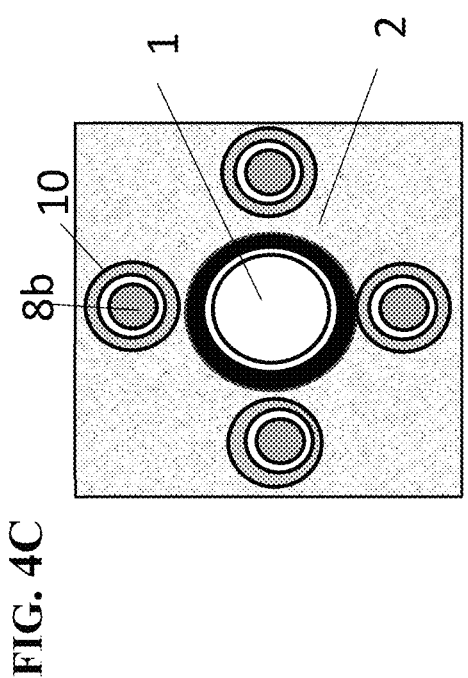

Vertical Supports (Preliminary) Design Process

MONOLITHIC TOWERS HAVING SUPPORT STRUCTURES, AND METHOD OF DESIGNING AND ASSEMBLING THE SAME

CROSS-REFERENCE TO RELATED APPLICATIONS

This application claims priority under 35 USC 119(e) to U.S. provisional application No. 63/140,227 filed on Jan. 21, 2021, the content of which is incorporated by reference in its entirety.

BACKGROUND OF THE INVENTION

The present disclosure relates to a composite tower structure for tall monolithic towers, support structures therefor, and method of designing/assembling the same.

The examples used herein relates to the application of the present disclosure to monolithic tower structures supporting wind turbines. However, the present disclosure can be applied to a variety of monolithic tower structures having different uses and functions (e.g., metrological instrumentation masts, microwave, observation, cell/internet, and TV antenna towers).

Referring now to FIG. 1A, a conventional monolithic tower structure includes a tower body 1 set on a foundation 2 and a plurality of piles 3 securing the tower body and the foundation in the ground. The tower body 1 has an elongated and truncated cone shape with sloping sides such that the top portion has a smaller diameter than the bottom base portion. Further, as shown in FIG. 1B, the tower body 1 is generally hollow, and the wall thickness 12 of the tower body 1 increases from the top towards the tower's base thereof to resist the increasing bending moment caused by the lateral loads discussed below.

As illustrated in FIG. 1C, in such a conventional tower structure that is fixed at its base and free to move at its top, the tower body 1 is subjected to a lateral force 4 (such as the thrust from a wind turbine), as well as the wind lateral loads 5 distributed along the tower height due to the wind. The combined lateral forces 4, 5 cause the tower body 1 to displace laterally. These lateral forces produce bending moments acting over the entire height of the tower 1, with the maximum bending moment occurring at the tower's base. Thus, a significant cross-sectional area (diameter, wall thickness) at the tower base section is required to withstand the bending stresses imposed by the lateral forces. The maximum bending moment at the base is resisted by a counter reactive moment 6 of equal magnitude. In addition, the total lateral forces 4, 5 acting over the entire height of the tower body 1 are also resisted by a counter reactive lateral force 7 of equal magnitude. Both the counter reactive moment 6 and counter reactive force 7 maintain the tower body 1 in equilibrium.

Thus, while it is beneficial to install tower structures of greater height in many situations, the increased lateral loads applied to the tower and the associated tower structural weight due to the increased height makes it difficult or economically unattractive. For example, wind turbine towers are currently ranging up to 80 m in height, with some extending to 100 m. A study by the United States Department of Energy ("Enabling Wind Power Nationwide," by Jose Zayas, Michael Derby, Patrick Gilman, Shreyas Ananthan, Eric Lantz, Jason Cotrell, Fredric Beck, Richard Tusing, United States Department of Energy, dated May 2015) concluded that a significant amount of additional wind resource (energy) can be captured in the United States if the height for a wind tower could be increased from the typical 80-100 m height to heights ranging from 120-160 m. Having the wind turbine located at a higher tower height will typically reduce the dynamic loading (due to wind turbulence) acting on the wind turbine blades. In addition, the wind turbine's ground-level noise level would also be reduced, thus less disruptive to the public.

However, with conventional tower structures and conventional design methodologies, the heights for wind turbine towers are reaching the maximum, due to limitations on the resulting tower weights, the associated costs of the towers, and the related transportation costs.

Additionally, there are practical limitations as to the size (e.g., diameter) and wall thickness of the tower structure, due to both land transportation (e.g., width/height of tower sections) restrictions and economic limits related to the fabrication (e.g., welding of thick-walled plates). With the above limitations, the tower structural weight would increase proportionally to approximately the square of the height of the tower.

To meet the above limitations and restrictions, the tower sections would typically be further subdivided into smaller sections to allow for land transportation to the site and then reassembled (e.g., welding) to a larger completed sections that would be lifted and vertically stacked to form the tower. The cost for the additional heavy load trucks to bring the subsections to the site and the reassembly of the subsections increases the tower fabrication/transportation costs.

Therefore, increasing the height of the tower above the conventional limit of 80-100 m would result in the cost of the tower fabrication and installation increasing approximately with the cube power of the tower height. The typical cost of design, fabrication, and installation of a land-based wind turbine tower is approximately 25% of the total wind turbine project cost. Therefore, the overall cost of a wind turbine project would increase significantly with tower heights extending beyond the conventional heights of 80-100 m, as the tower would become a more dominant cost component.

Therefore, innovative approaches will be needed in the design and construction/installation technologies to expand the tower heights considering the above-identified issues.

BRIEF SUMMARY OF THE INVENTION

In one embodiment of the present disclosure, a tower structure includes a tower body, a foundation to which a bottom end of the tower body is fixed, a plurality of vertical supports fixed around a perimeter of the tower body, and a support structure connecting a top portion of each of the plurality of vertical supports to the tower body.

In another embodiment, the tower body is hollow and has a wall having a thickness which varies along a height of the tower body, and the thickness of the tower body has a step on an inner surface of the wall at a height corresponding to a connection point of the support structure and the tower body.

In another embodiment, the thickness of the wall decreases from the bottom end of the tower body to a height corresponding to a connection point of the support structure and the tower body, increases with the step on the inner surface of the wall, and decreases from the height corresponding to the connection point of the support structure and the tower body to a top end of the tower body.

In another embodiment, the tower structure further includes one or more intermediate guide structures connected to the tower body and supporting a middle portion of the plurality of vertical supports. Each of the one or more intermediate guide structures may include a plurality of extensions radially extending from the tower body and including a ring guide structure disposed at a distal end thereof which surrounds and accommodates the middle portion of the plurality of vertical supports.

In another embodiment, each of the one or more intermediate guide structures may include a structural support ring connected to the tower body at a center thereof and including a plurality of through holes surrounding and accommodating the middle portion of the plurality of vertical supports.

In another embodiment, the support structure includes a plurality of extended plates radially extending from the tower body and including a plurality of ring guide structures disposed at a distal end thereof which accommodates and fixes the top portion of the vertical supports.

In another embodiment, the support structure includes a structural support ring connected to the tower body at a center thereof and including a plurality of through holes accommodating and fixing the top portion of the plurality of vertical supports.

In another embodiment, the foundation includes a plurality of piles securing the foundation to the ground, and a bottom end of each of the plurality of vertical supports are fixed to the foundation.

In another embodiment, the bottom end of the each of the plurality of vertical supports are fixed to the foundation or a ground by a plurality of piles.

In another embodiment, the plurality of vertical structures is symmetrically fixed around the perimeter of the tower body and is selected from one among thin-walled tubular sections, thick-walled pipes, threaded pipe sections, pre-tensioned solid rods, and pre-tensioned cables.

In yet another embodiment of the present disclosure, a method of constructing a tower structure includes: fixing a base section of a tower body to a pre-installed foundation; constructing a lower portion of the tower body by stacking and connecting one or more lower intermediate section(s) of the tower body on the base section, wherein the one or more lower intermediate section(s) includes a support structure; positioning a plurality of vertical supports on a perimeter of the tower body; connecting a top portion of each of the plurality of vertical supports to the support structure; and constructing an upper portion of the tower body by stacking and connecting one or more upper intermediate section(s) of the tower body, wherein the plurality of vertical supports applies an external moment to the tower body at a height of the tower body corresponding to a connection point of the support structure and the tower body to counter a bending moment of the tower body.

In another embodiment, the method further includes: supporting each of the plurality of vertical supports at or near a middle portion of the vertical supports via one or more intermediate guide structure(s) connected to the tower body, wherein the one or more intermediate guide structure(s) are disposed on the lower portion of the tower body and each of the one or more intermediate guide structure(s) includes a plurality of through holes or ring guide structures surrounding and accommodating the middle portion of the vertical supports.

In another embodiment, the positioning of the plurality of vertical supports includes routing the plurality of vertical supports through the plurality of through holes or ring guide structures of the one or more intermediate guide structure(s).

In another embodiment, the support structure includes a plurality of extended plates radially extending from the tower body and including a plurality of through holes accommodating and fixing the top portion of the vertical supports, and wherein the connecting the top portion of each of the plurality of vertical supports includes: inserting the top portion of each of the plurality of vertical supports into a partially open distal end of the plurality of extended plates; and closing the partially open distal end by attaching a structural face plate.

In another embodiment, the support structure includes a structural support ring connected to the tower body at a center thereof and including a plurality of through holes accommodating and fixing the top portion of the plurality of vertical supports, and wherein the plurality of vertical supports is first positioned on the perimeter of the tower body, and the one or more lower intermediate section(s) of the tower body is stacked and connected so as to accommodate the top portion of the plurality of vertical supports in the plurality of through holes of the structural support ring.

In another embodiment, the constructing the tower body includes connecting the support structure to the one or more intermediate section(s) of the tower body.

In yet another embodiment of the present disclosure, a method of designing and constructing a tower structure for supporting a wind turbine includes: determining Rotor-Nacelle Assembly (RNA) input parameters of the wind turbine and tower input parameters of the tower structure; calculating key tower parameters based on the RNA input parameters and the tower input parameters; defining tower mass distribution from wall thickness and estimating tower first mode natural frequency based on the key tower parameters; calculating key vertical support parameters based on vertical support input parameters and support structure input parameters; calculating tower weight and vertical support weight based on the tower mass distribution from the wall thickness, the key vertical support parameters, and the tower input parameters; manufacturing the tower structure based on the calculated tower weight and the vertical support weight; and constructing the manufactured tower structure.

In another embodiment, the RNA input parameters include RNA weight, maximum turbine thrust force, height of the RNA, rotor rotational frequency, a number of blades of the wind turbine, maximum design wind speed, wind speed vertical profile, spacing between an RNA hub height and a top of the tower structure, and wherein the tower input parameters include a maximum base diameter of the tower structure, minimum top end diameter of the tower structure, maximum/minimum wall thicknesses, modulus of elasticity, and effective tower weight density.

In another embodiment, the key tower parameters include tower diameter distribution, lateral load distribution and related tower bending moment distribution, and the wall thickness of the tower structure.

In another embodiment, the vertical support input parameters include a number of the vertical supports, positioning of the vertical supports, and vertical support modulus of elasticity, and wherein the support structure input parameters include counter moment and tower rotation of the tower structure at the support structure, spacing between vertical supports and tower shell plating, and a number and spacing of intermediate guide structures.

In another embodiment, the key vertical support parameters include reactive loads of the vertical supports to produce the counter moment, vertical support diameter and wall thickness, vertical support buckling load based on the number of the intermediate guide structures, vertical support compression load which is less than the vertical support buckling load.

In another embodiment, the constructing the manufactured tower structure comprises: fixing a bottom end section of a tower body to a pre-installed foundation; constructing the tower body by stacking and connecting one or more intermediate section(s) of the tower body on the bottom end section and by stacking and connecting a top end section of the tower body on the one or more intermediate section(s), wherein the one or more intermediate section(s) comprises a support structure; positioning a plurality of vertical supports on a perimeter of the tower body; and connecting a top portion of each of the plurality of vertical supports to the one or more intermediate section(s) of the tower body through the support structure, wherein the plurality of vertical supports applies an external moment to the tower body at a height of the tower body corresponding to a connection point of the support structure and the tower body to counter a bending moment of the tower body

BRIEF DESCRIPTION OF THE DRAWINGS

A brief description of each drawing will be provided for better understanding of the drawings referenced in the detailed description of the present disclosure. The present disclosure is illustrated by way of example and not limited to the figures of the accompanying drawings in which like references indicate similar elements.

FIGS. 4A-4D illustrate a composite tower structure using thin-walled tubular vertical supports according to an embodiment of the present disclosure.

DETAILED DESCRIPTION OF THE INVENTION

Figure 1A:
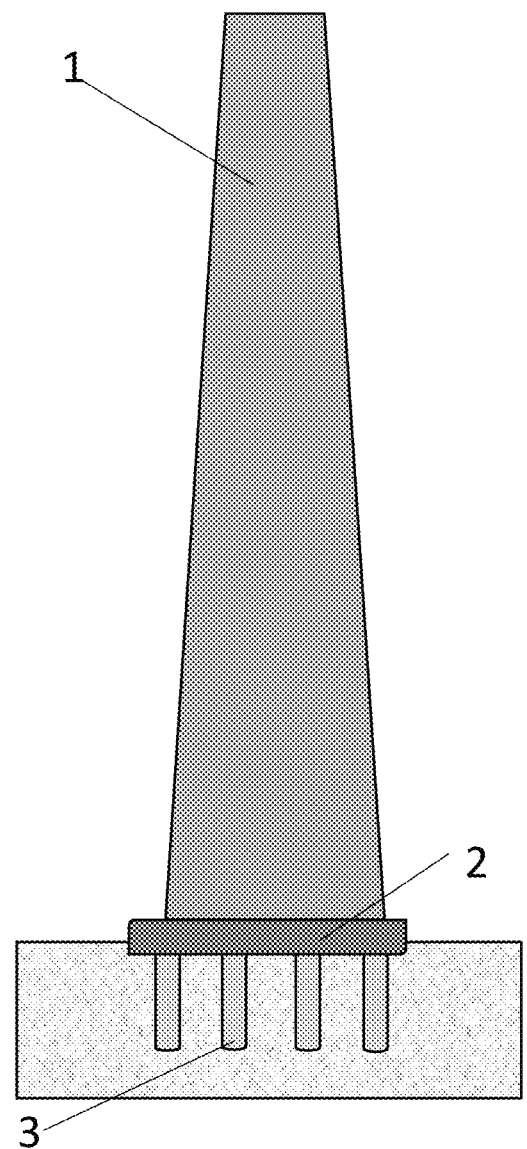
FIGS. 1A-1C illustrate a conventional tower structure, a cross-sectional view thereof, and a simplified model showing forces and moments acting thereon, respectively.
Figure 1B:
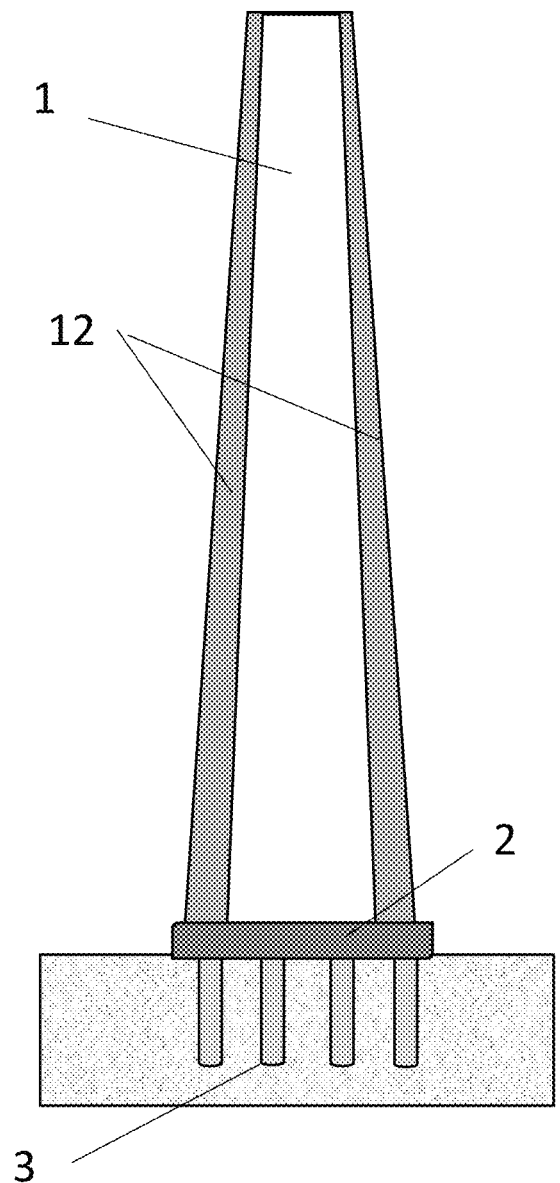
Figure 1C:
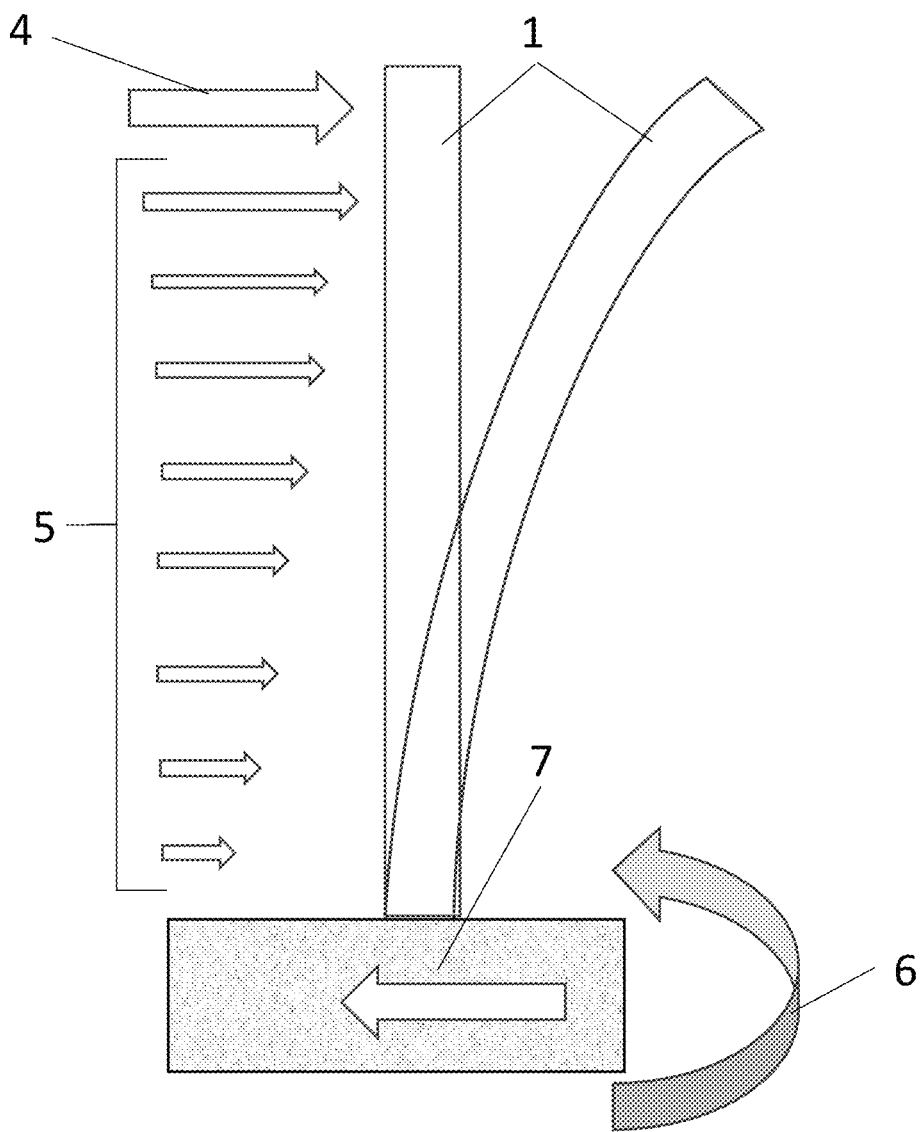

Hereinafter, exemplary embodiments of the present disclosure will be described with reference to the accompanying drawings. In the following description, the same elements may be designated by the same reference numerals although they are shown in different drawings. Further, in the following description of the present disclosure, a detailed description of known functions and configurations incorporated herein will be omitted when it may make the subject matter of the present disclosure rather unclear. In addition, a preferred embodiment of the present disclosure will be described hereinbelow, the technical thought of the present disclosure is not restricted or limited thereto and may be embodied in various manners through modification by those skilled in the art. In the meantime, for convenience's sake, all directions described hereinafter are written based on the drawings, and the technical scope of the present disclosure is not limited by the relevant directions.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included. Moreover, in describing elements of the present disclosure, terms such as first, second, A, B, (a), (b) and others may be used. Such terms are used only for purposes of distinguishing an element from other elements, but do not limit the substance of the element, sequence, or order.

Figure 2A:
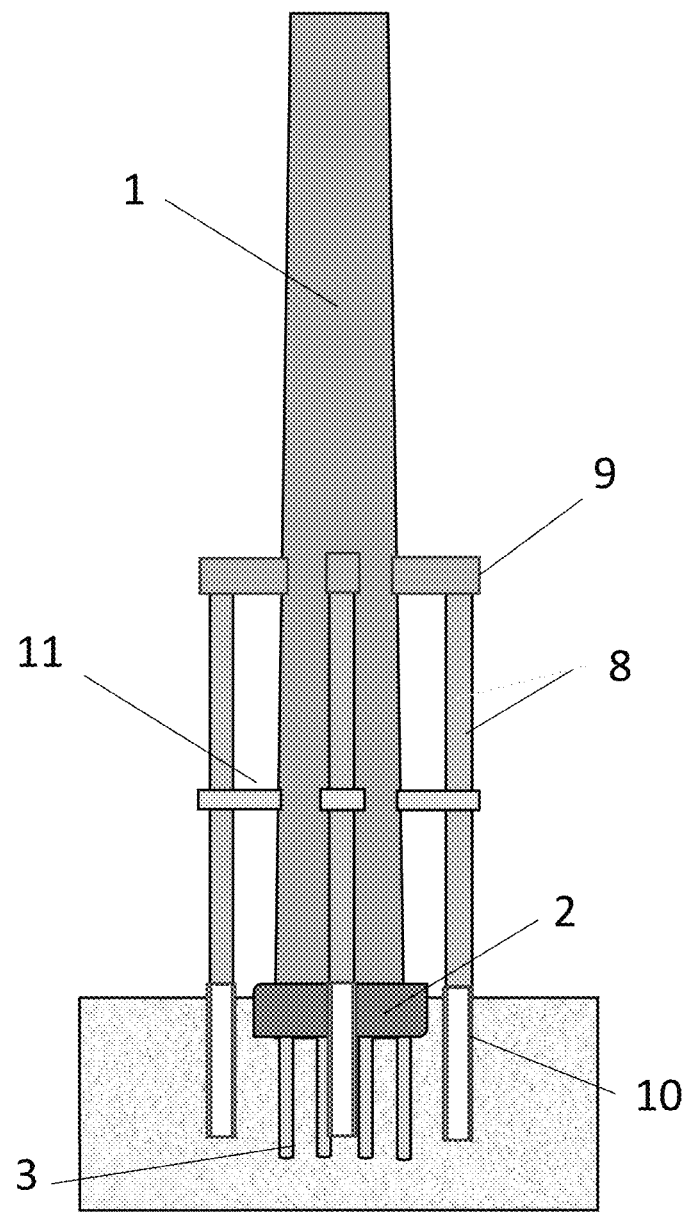
FIGS. 2A-2C illustrate a composite tower structure according to an embodiment of the present disclosure, a cross-sectional view thereof, and a simplified model showing forces and moments acting thereon, respectively.

Referring now to FIG. 2A, an embodiment of the present disclosure for a composite tower structure includes a tower body 1 fixed to a foundation 2 at a bottom end thereof and the foundation 2 is secured to the ground via a plurality of piles 3. The composite tower structure also includes a plurality of vertical supports 8 positioned around a perimeter of the tower body 1. The top portion (e.g., a top end) of each of the plurality of vertical supports 8 is connected to a side portion of the tower body 1 via a support structure 9. The bottom end of the each of the plurality of vertical supports 8 is fixed to the ground using independent piles 10.

Further, the composite tower structure may include an intermediate guide structure 11 connected to the tower body 1 between the support structure 9 and the bottom end of the tower body 1, which stabilizes a middle portion of the vertical supports 8. The intermediate guide structure 11 provides lateral restraint to the vertical supports 8 as a means to increase the buckling capacity of the vertical supports 8.

Figure 2B:
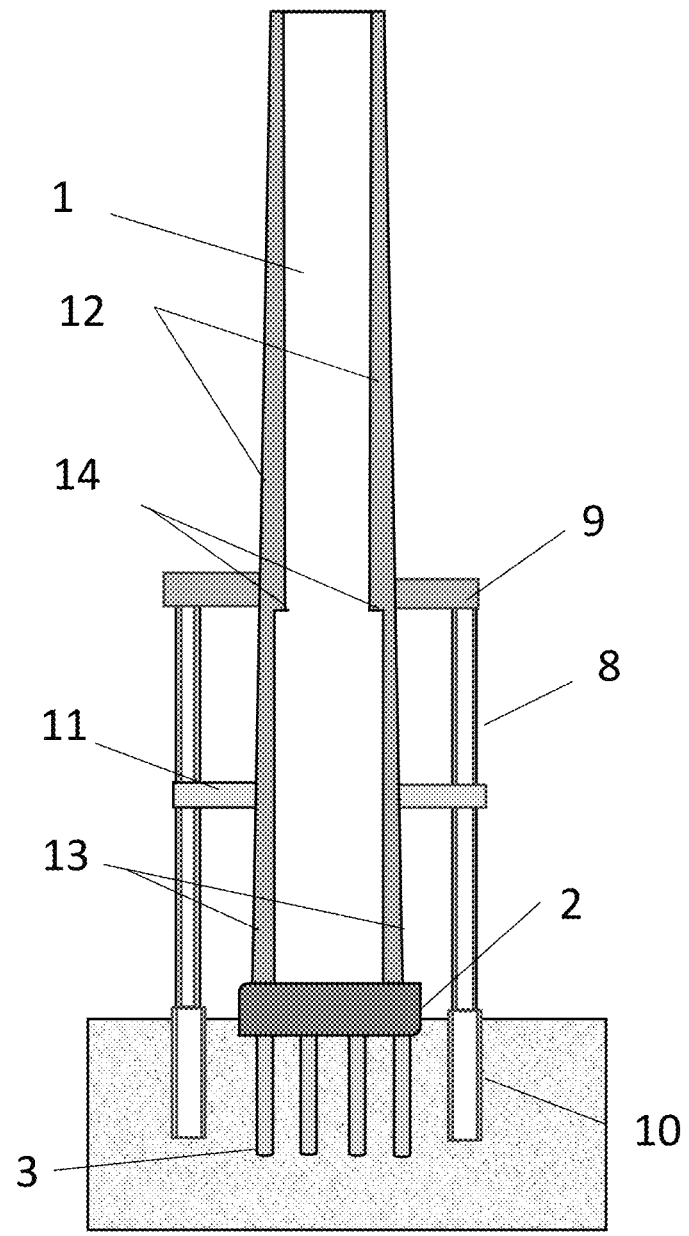

As shown in FIG. 2B, the composite tower structure according to an embodiment of the present disclosure includes a tower body 1 having a hollow cylindrical shape with a tapered diameter towards the top end of the tower body 1. Further, the tower body 1 includes a tower wall with a varying thickness along the height of the tower body 1. That is, the tower wall may include an upper tower wall portion 12, a step portion 14 having a change in wall thickness, and a lower tower wall portion 13. The upper tower wall portion 12 extends from the top of the tower body 1 to the height of the support structure 9, and the lower tower wall portion 13 extends from the height of the support structure 9 to the bottom of the tower body 1.

The wall thickness of the upper tower wall portion 12 increases from the top of the tower to the height of the support structure 9. This increase in wall thickness in the upper tower wall portion 12 is similar to the conventionally designed tower body 1 (see FIG. 1A) for the upper section of the tower. However, in the composite tower structure of the present disclosure, the wall thickness of the lower tower wall portion 13 is reduced directly below the height of the support structure 9 by the step portion 14. At or near the connection point between the tower body 1 and the support structure 9, there is a step portion 14 having a change in wall thickness on the inner surface of the wall which significantly decreases the wall thickness. Below the step portion 14, the wall thickness of the lower tower wall portion 13 of the tower body 1 again increases towards the bottom end of the tower body 1.

The plurality of vertical supports 8 are positioned around the perimeter or circumference of the tower body 1 and may have various structures and shapes and may be made of various different materials. For example, the vertical supports 8 may be, but are not limited to, vertically oriented thin-walled tubular (pipe-type) sections, vertical pre-tensioned solid rods, or cables (such as structural "bridge" cables), or vertically oriented threaded pipe sections or thick-walled pipes (such as drill pipes) but are not limited thereto. Further, while the exemplary drawings of the present application show embodiments of the present disclosure having four, eight or twelve vertical supports, the number of the vertical supports may be adjusted depending on the size, location, requirements of the tower structure. In a preferred embodiment, the vertical supports 8 are positioned symmetrically around the perimeter or circumference of the tower body 1.

Figure 2C:
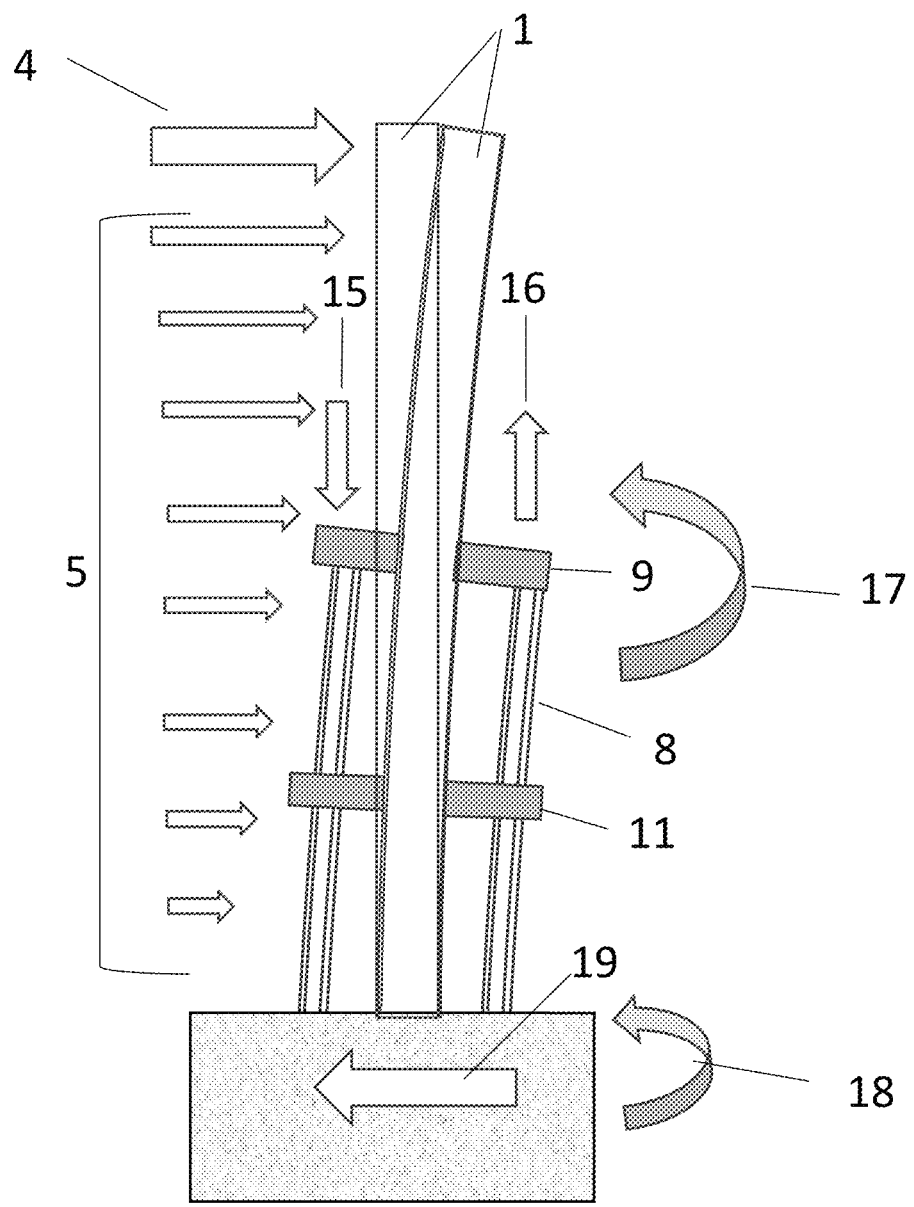

Referring now to FIG. 2C, the tower body 1 as shown in FIGS. 2A-2B displaces laterally but is limited by the vertical supports 8 attached to the tower body 1 at the support structure 9. The lateral displacement of the tower body 1 at the support structure 9 causes the vertical supports 8 to either elongate (stretch) or compress (shrink), depending on their position with respect to the direction of the displaced tower body 1. The elongation or compression of the vertical supports 8 will generate vertical reactive forces 15, 16 in the vertical supports 8. These reactive forces produce a counter reactive moment 17 that is applied to the tower body 1 at the support structure 9. This moment 17 counteracts the bending moment acting above the support structure 9. The vertical reactive forces 15, 16 developed in the vertical supports 8 are directly transmitted to the ground, thus resulting in a zero net vertical load applied to the tower body 1. The lateral forces 5 (e.g., wind loads) are applied along the entire height of the tower body 1, but below the support structure 9, the lateral forces 5 produce bending moments that will be reacted by a counter reactive moment 18 at the tower's base. In addition, the total lateral forces 4, 5 (e.g., wind loads+ forces applied by the operational wind turbine) acting over the height of the tower body 1 are resisted by a counter reactive force 19 of equal magnitude. The composite tower of the present disclosure is designed such that both the counter reactive moments 17, 18 and the counter reactive force 19 help maintain the tower body 1 in equilibrium.

In more detail, at the connection point of the tower body 1 and the support structure 9 in which the step portion 14 occurs in the inner tower wall due to a change in the wall thickness, a counter reactive moment 17 is developed by the vertical reactive forces 15, 16 in the vertical supports 8 to counter the bending moment produced by the lateral forces 4, 5 acting above the support structure 9. In other words, the counter reactive moment 17 developed by the vertical supports 8 reduces the bending moment in the tower body 1 and enable a significant decrease in the wall thickness at the step portion 14 and below the support structure 9, thereby reducing the total tower weight. In addition, the wall thickness of the lower tower portion 13 below the step portion 14 increases towards the tower's base to resist the increasing bending moment caused by the lateral forces 5 directly acting over the lower section of the tower body 1.

The material and shape of the vertical supports 8 can be selected to limit the amount of lateral displacement of the tower body 1 based on the properties of the material (modulus of elasticity), the number, length, and cross-sectional properties (diameter, wall thickness) of the vertical supports 8. The vertical support 8 design will need to consider the potential for buckling and may be required to be either pre-tensioned (particularly for solid rods and cables) or laterally restrained by intermediate guide structures 11 attached to the tower body 1.

Figure 3:
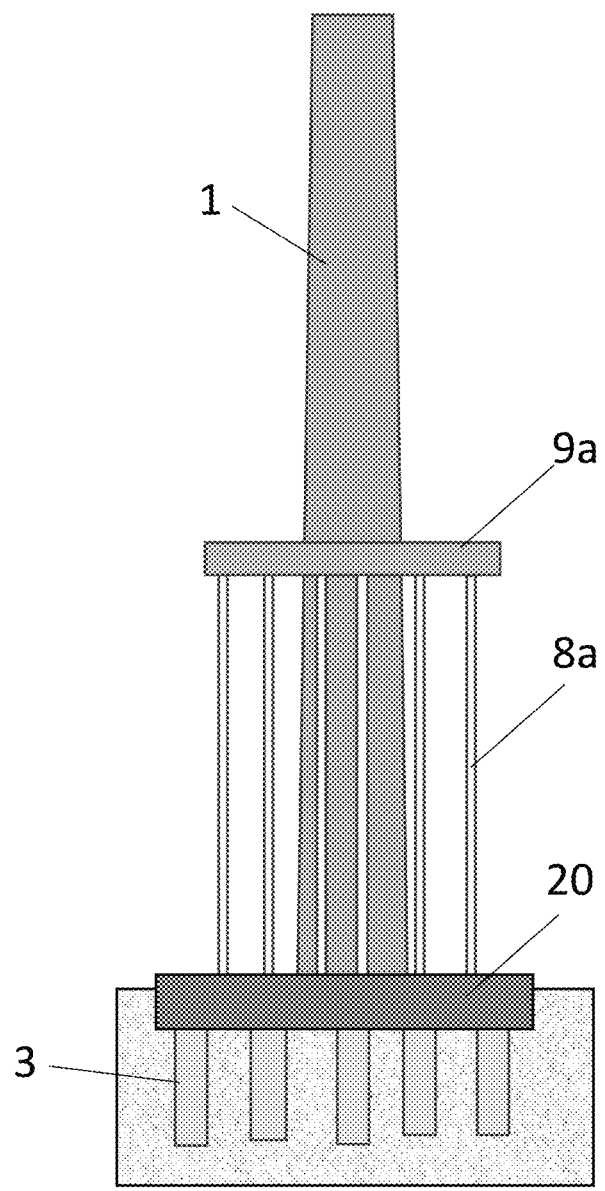
FIG. 3 illustrates an embodiment of the present disclosure in which the vertical supports are pretensioned solid rods or cables.

The intermediate guide structures 11 may not be required if the vertical supports 8 have sufficient capacity to resist the maximum design compression resistive load without buckling. For example, an embodiment shown in FIG. 3 includes a plurality of vertical supports connected to the tower body 1 via a support structure 9a. In this embodiment, the support structure is a structure ring plate 9a, and the plurality of vertical supports are a plurality of solid rods or cables 8a that are symmetrically positioned around the tower body 1. Each solid rod or cable is connected at the top thereof to the support structure ring plate 9a and at the bottom thereof to a receptacle that is embedded in a large, integrated tower/ vertical support foundation 20. The integrated foundation is secured to the ground using a plurality of piles 3. The solid rods or cables used as the vertical supports 8a in this embodiment would be pre-tensioned above the design compression loads to prevent buckling.

Referring back to FIGS. 2A-2C, if necessary, the maximum allowable compression load of the vertical supports 8 can be increased by adding one or more intermediate guide structures 11, which may be positioned between the support structure and the tower's base, to provide additional lateral restraint of the vertical supports 8, thereby increasing their buckling capacity.

Referring now to FIGS. 4A-4D, these figures illustrate the vertical supports 8b and a method of installing these vertical supports 8b of the embodiment shown in FIGS. 2A-2C. FIG. 4A illustrates an elevation view of the composite tower according to an embodiment of the present disclosure, and FIGS. 4B-4D illustrate various cross-section views of the composite tower shown in FIG. 4A. FIG. 4B illustrates the support structure 9b used for connecting the vertical supports 8b to the tower body 1. In this embodiment, each of the vertical support 8b is a thin-walled tubular (pipe-type) section, and the support structure 9b is made with metal plates that are joined (e.g., welded or mechanically connected) together to the tower body 1 to form structural boxes having the strength to transfer the counter reactive moment 17, developed by the vertical reactive forces 15, 16 in the vertical supports 8b, to the tower body 1. That is, the support structure 9b includes a plurality of plates radially extending from the tower body 1 and comprising a plurality of ring guide structures 21a disposed at a distal end thereof which accommodates and fixes the top portion of the plurality of vertical supports 8b.

The vertical supports 8b may be installed in the composite tower structure by different approaches. In a first exemplary approach, the vertical supports 8b are installed (e.g., using a crane) from either the top or bottom of the support structure 9b by routing the vertical supports 8b through the respective ring guide structure 21a located in the extended plates forming the support structure 9b, as shown in the right side of FIG. 4B.

A second exemplary approach shown on the left side of FIG. 4B involves installing (e.g., using a crane or other device) the vertical supports 8b through a partially opened distal end of the extended plates 21b, of the support structure and then enclosing the vertical supports 8b within the support structure 9b by attaching (by welding or mechanically joining) a structural insert face plate 22 to complete the structural box.

For both approaches, the process is repeated for each of the vertical supports 8b, and the vertical supports 8b would be connected by welding, mechanically or grouting to the support structure 9b.

FIG. 4C also illustrates similar methods of installing the vertical supports 8b through the intermediate guide structures 11a. In this embodiment, the intermediate guide structure 11a includes a plurality of plates radially extending from the tower body 1 and including a ring guide structure 21c disposed at a distal end thereof which surrounds and accommodates a middle portion of the plurality of vertical supports 8b. The method of installing the vertical supports 8b through the intermediate guide structures 11a may use the two approaches described above with respect to the installation of the vertical supports 8b through the support structure 9b: (1) routing the vertical supports 8b through the ring guide structure 21c of the intermediate guide structure 11a from the top or bottom thereof, as shown on the left side of FIG. 4C, or (2) installing the vertical supports 8b through a partially opened distal end 21d of the extensions of the intermediate guide structures 11a and enclosing the vertical supports 8b with the attachment of a structural face plate ./22, as shown on the right side in FIG. 4C. Here, the vertical support 8b are laterally restrained in the ring guide structures of the intermediate guide structure 11a, but are not required to be fixed thereto, whereas the top portions of the vertical supports 8b are securely fixed to the support structure 9b. That is, the ring guide structures of the intermediate guide structures 11a only restrain the lateral displacement of the vertical supports 8b by enclosing the vertical supports therein, but they are not securely fixed to each other.

FIG. 4D illustrates the connection of the vertical supports 8b to independent piles 10 embedded in the ground via welding, mechanically, or by grouting. Also illustrated in FIG. 4D is the tower body 1 attached to the foundation 2.

Figure 5A:
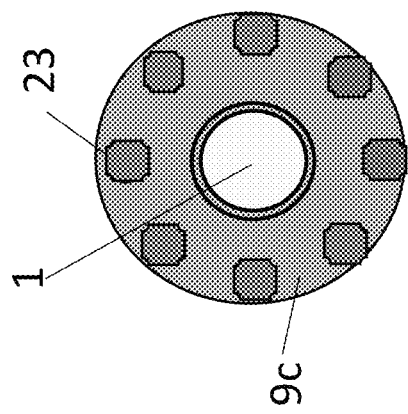
FIGS. 5A-5D illustrate a composite tower structure using thick-walled pipes for vertical supports according to yet another embodiment of the present disclosure.
Figure 5B:
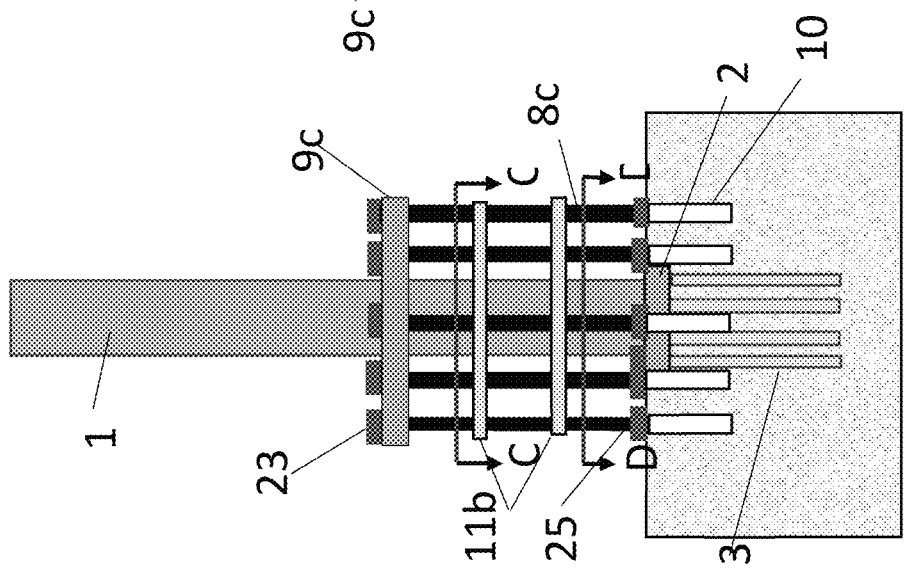
Figure 5C:
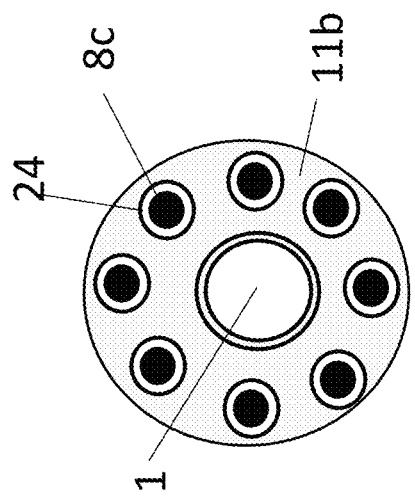
Figure 5D:
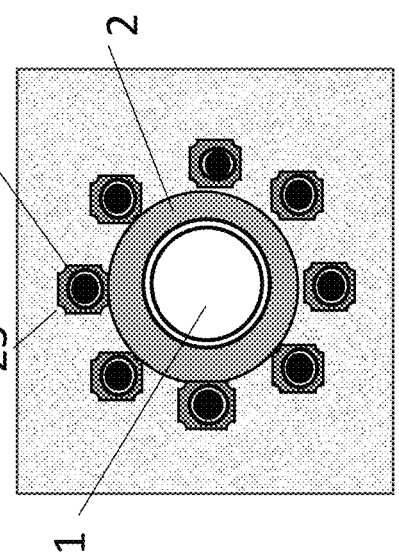

Referring now to FIGS. 5A-5D, these figures illustrate another embodiment of the composite tower structure. FIG. 5A illustrates an elevation view of the composite tower structure, and FIGS. 5B-5D illustrate various cross-sectional views of the composite tower structure of FIG. 5A. In this illustrated embodiment, the support structure 9c is composed of one structural ring plate connected to the tower body 1 at a center thereof and including a plurality of through holes accommodating and fixing the top portion of the plurality of vertical supports 8c.

FIG. 5B illustrates the support structure 9c used for connecting the vertical supports 8c to the tower body 1. In this embodiment, a plurality of thick-wall pipes (such as drill pipe) is used as the vertical supports 8c. These vertical supports 8c are connected to the structural support 9c that is attached to the tower body 1. The structural support 9c has sufficient strength to transfer the counter moment 17, developed by the vertical reactive forces 15, 16 (see FIG. 2C) in the vertical supports 8c, to the tower body 1.

Additionally, two intermediate guide structures 11b of this embodiment, composed of structural ring plates, are connected to the tower body 1 and include a plurality of through holes 24 (see FIG. 5C) surrounding and accommodating a middle portion of the plurality of vertical supports 8c. The vertical supports 8c are routed through the plurality of through holes 24 of the intermediate guide structures 11b, as shown in FIG. 5C, to restrain the vertical supports 8c from lateral displacement, thus increasing the buckling load capacity of the vertical supports 8c. In FIG. 5A, The number of intermediate guide structures 11b is two, as illustrated in FIG. 5A. However, the present disclosure is not limited thereto, and the composite tower may have zero, one, two or more intermediate guide structures 11b.

As illustrated in FIG. 5B, the top portion of each vertical support 8c is connected and fixed to the structural support 9c using a mechanical connector 23. The bottom portion of each vertical support 8c is connected and fixed to an independent pile 10 using a mechanical connector/receptor 25, as shown in FIG. 5D. While not shown in FIGS. 5B and 5D, the top and bottom portions of the vertical supports 8c can alternatively be connected to the respective support structure and pile via welding or grouting.

The present disclosure is not limited to the embodiments shown in the drawings, and one of ordinary skill in the art would readily appreciate the flexibility of the composite tower structure and modify/combine the specific embodiments shown in the present disclosure. For example, the type of support structure (extended plates and structural ring plates), the number of intermediate guide structure (none, or one or more), the type of intermediate guide structure (extended plates and structural ring plates), number and type of vertical supports (etc.) may be selected and used in various combinations to meet the composite tower application requirements.

Figure 6:
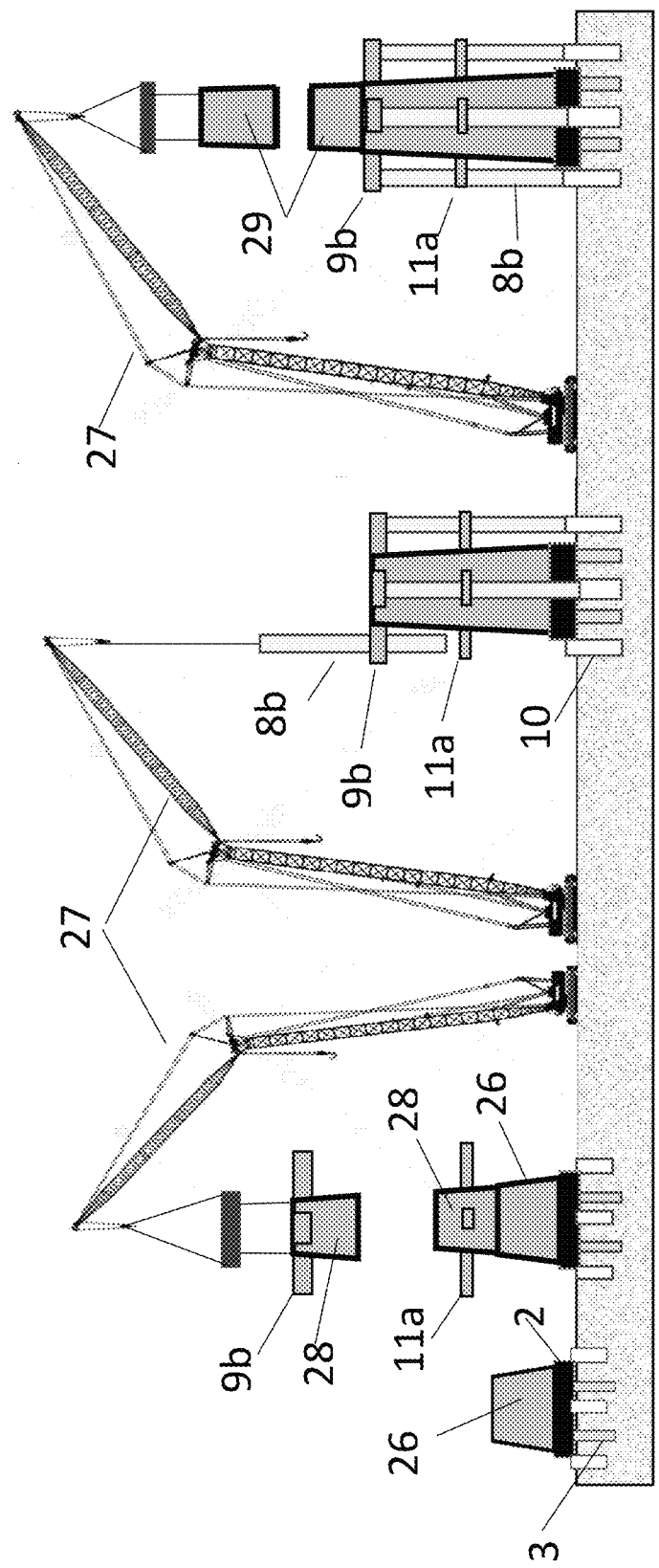
FIG. 6 illustrates an example construction sequence for the composite tower according to an embodiment of the present disclosure.

The construction sequence of the composite tower according to an embodiment of the present disclosure may be similar to the conventional tower construction sequence, with the exception of installing the vertical supports, structural support, and/or the intermediate guide structure(s). In one embodiment, the vertical supports may be installed and attached to the structural support connected to the lower portion of the tower and to the installed piles prior to lifting and setting the upper portion of the tower and prior to the lifting and setting the wind turbine RNA. An example of a construction sequence for the composite tower is illustrated in FIG. 6 and briefly outlined below. For this example, the vertical supports 8b, the support structures 9b and the intermediate guide structures 11a as shown in FIGS. 4A-4D are assumed for this construction sequence. The construction sequence may include the following steps:

1. Required structures of the composite tower, such as multiple prefabricated tower body sections, sections of vertical supports (etc.), would be transported (via heavy-load trucks) to the tower/wind turbine installation site (not shown).
2. The base tower section 26 is first rotated to the vertical position with a heavy-lift crane 27 and then connected to the preinstalled tower foundation 2.
3. The lower tower sections 28 of the lower portion of the tower would sequentially be rotated to the vertical position, lifted, and set on top of the previously installed base tower section, and then connected (via welding or mechanically) to the respective lower installed section.
4. The lower tower sections 28 of the lower portion of the tower may include the support structure 9b and one or more intermediate guide structures 11a according to an embodiment of the present disclosure. Alternatively, the support structure 9b and the one or more intermediate guide structures 11a may be attached to one or more of the lower tower sections 28 after all of the tower sections 28, 29 are installed and connected to form the tower body.

5. Multiple sections (not shown) of the vertical supports 8*b* may be joined (via welding or mechanically) to form the entire length of the plurality of vertical support 8*b* (not shown).

6. Once the lower portion of the tower structure is completed, each vertical support 8*b* would be sequentially lifted above the structural support, using a heavy lift crane 27 and then routed (lowered) through the structural support 9*b* and the intermediate guide structure 11*a*.

7. The vertical support 8*b* would then be connected at the top end thereof to the structural support 9*b* (via welding, mechanically, or grouting). The bottom end of the vertical support 8*b* would then be connected (via welding, mechanically, or grouting) to the pre-installed pile 10 to complete the installation of the vertical support 8*b*.

8. One or more upper tower sections 29 of the upper portion of the tower would be sequentially rotated to the vertical position, lifted, and set on top of the previously installed tower section, and then connected (via welding or mechanically) to the respective lower installed section, as illustrated in FIG. 6.

9. While not shown in FIG. 6, the construction sequence would continue with the wind turbine Rotor-Nacelle Assembly (RNA) being lifted and set on top of the tower structure using a high-capacity crane in a manner similar to the conventional tower. The multiple wind turbine blades would then be lifted and connected to the RNA to complete the construction sequence.

Figure 7A:
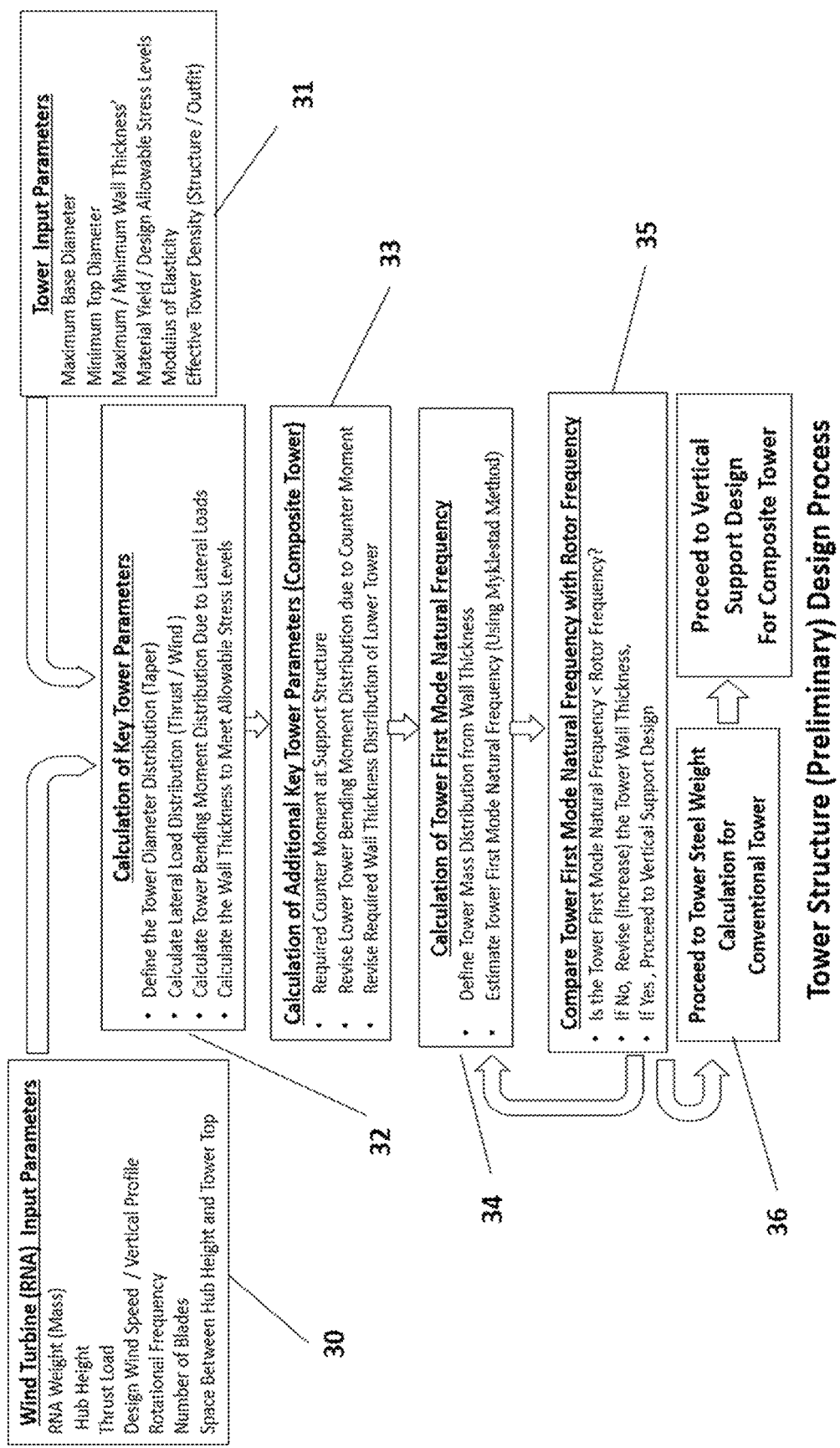
FIGS. 7A-7B provide "flow charts" showing a process for a preliminary design of the conventional and composite towers for a wind turbine application.
Figure 7B:
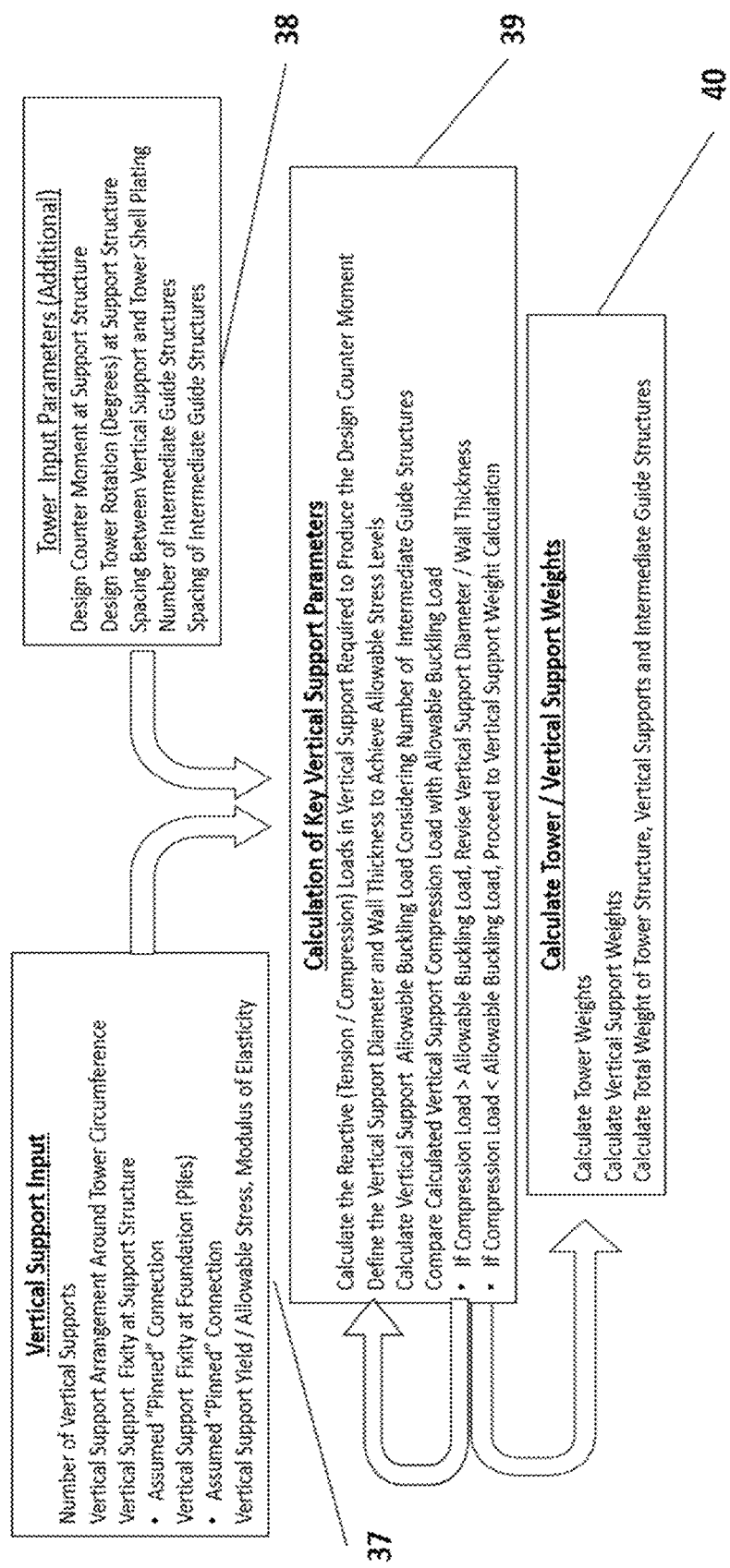

A preliminary design process (flowchart) used for both the conventional and composite tower structure according to an embodiment of the present disclosure is illustrated in FIGS. 7A—7B. The process of designing the towers begins by defining the key input parameters for the wind turbine (RNA) and tower. The wind turbine RNA input parameters 30 may include RNA weight (mass) and height above the ground (or hub height), the rotor rotational frequency (given in Hz), the number of blades, the maximum turbine thrust force, the maximum design wind speed, the associated wind speed vertical profile, and the spacing between the hub-height and the top of the tower. The tower input parameters 31 may include the effective weight density of the tower structure, including the outfitting (e.g., stairways, platforms, structural attachments[etc.]), the modulus of elasticity of the material, the design yield and allowable stress levels for the tower, the minimum and maximum tower diameters for the tower top (required to support the wind turbine) and base (to meet transportation limits), respectively, as well as the minimum and maximum wall thicknesses of the tower body, based on fabrication limits.

Once the above input parameters 30, 31 are defined, the key design tower parameters 32 are then calculated. These parameters include the tower diameter distribution (or taper), lateral load distribution due to the wind turbine thrust and wind loads, the bending moment distribution, and the tower wall thickness to meet the allowable stress levels. Here, the distribution of the lateral forces acting on the tower from the combined turbine thrust and wind are calculated. The lateral force distribution produces a corresponding bending moment distribution acting over the height of the tower. The required wall thickness distribution over the tower's height is then defined that will keep the bending stress levels under the allowable stress level.

Additional key tower parameters 33 to be considered and calculated for the composite tower include the required counter moment at the support structure, the adjustment of the lower tower bending moment distribution due to the calculated counter moment, and adjustment of the required wall thickness distribution of the lower portion of the tower below the support structure to meet the allowable stress level, as defined in the tower input parameters 31. Here, the resulting bending moment just above the support structure is determined, which is equal to the required counter bending moment to be developed by the reactive loads in the vertical supports. When this counter moment is applied to the tower structure, the resulting bending moment at the support structure is effectively zero. Once the counter moment to be applied by the vertical supports is established, the tower's bending moment distribution below the support structure is then revised (reduced), considering only the lateral wind forces acting directly on the tower. The tower's wall thickness distribution below the support structure is then also adjusted (reduced) to keep the bending stress levels under the allowable stress level.

Once the tower's sectional properties (diameter and wall thickness distribution) and associated weight distributions are established for both the conventional and composite towers, the first mode natural frequency (Hz) of the towers are estimated using numerical methods 34. An example of one such method was developed by Myklestad ("A New Method of Calculating Natural Modes of Uncoupled Bending Vibration of Airplane Wings and other Types of Beams," by N. O. Myklestad, Journal of Aeronautical Science, Volume 11, Issue 2, dated August 2012).

Thereafter, the tower's calculated first mode of natural frequency is compared with the rotor frequency 35. Ideally, the tower's first mode natural frequency should be above both the rotational frequency of the turbine and the turbine's blade frequency (e.g., three times the rotational speed for the typical three-bladed wind turbine), thus avoiding any dynamic excitation of the tower. Achieving this condition is typically referred as a "stiff-stiff" tower design. However, it is generally acceptable if the tower's first mode natural frequency is between the rotor frequency and the blade frequency, as the tower's first mode natural frequency would only be subjected to transient excitations during the wind turbine's start-up and shut-down operations. This is typically referred to as a "stiff-soft" tower design. However, if the tower's first mode natural frequency is less than the rotor frequency, the tower's diameter and/or wall thickness distributions would be revised by an iterative process.

At this stage for designing a conventional tower, the total tower weight can be calculated, and the design process is essentially completed (Step 36 in FIG. 7A). However, for designing the composite tower of the present disclosure, a design process for the vertical supports should be undertaken. As illustrated in FIG. 7B, which is a continuation of the flowchart shown in FIG. 7A, a preliminary design process for the vertical supports according to the present disclosure is described. First, the vertical support input parameters are defined 37. These parameters include the number of the vertical supports, the vertical support arrangement (spacing) around the tower body circumference, the assumed vertical support fixity (fixed or pinned connection) at the support structure and foundation piles, the yield and allowable stresses and the modulus of elasticity for the vertical supports. Further, additional tower input parameters 38 are defined, which include the designed counter moment to be applied at the support structure and the allowable design tower rotation (degrees) at the support structure, the radial spacing between the vertical supports and the tower shell plating, the number and vertical spacing of intermediate guide structures (if required) 38.

Based on the vertical support and tower input parameters, the key vertical support design parameters are then calculated 39. These key parameters include the reactive (tension/compression) loads in the vertical supports required to produce the design counter moment, the vertical support diameter and wall thickness to achieve the allowable stress levels, the vertical support allowable buckling load considering the number and vertical spacing of the intermediate guide structures (if any). The calculated vertical support parameters 39 also include the comparison of the calculated vertical support compression load with the allowable buckling load and adjusting the vertical support's diameter and/or wall thickness when the vertical support compression load is greater than the allowable buckling load. The vertical support design process will likely require several iterations to define the optimum design and configuration, in terms of less weight and/or cost.

Once the optimized vertical support design has been defined, the revised tower weights, vertical support weights and the intermediate guide structure weights are calculated based on the calculated key vertical support parameters to determine the total weight of the composite tower structure 40.

As a simplification, the above-described preliminary design process neglects the contributions of the vertical supports to the overall structural stiffness and weight (mass) of the tower when estimating its first mode natural frequency. Including these contributions would likely increase the tower's first mode natural frequency. In addition, the preliminary design process assumes that by having sufficient capacity to resist the bending moments developed in the tower, the tower structure would also have a sufficient structural capacity to resist both the shear forces developed over the height of the tower (due to the turbine thrust and wind forces) and the global buckling of the tower. Finally, the preliminary design process excludes the assessment of the fatigue-related damage of the tower structure over the tower's projected operational life. Therefore, the first-mode frequency (including the vertical supports), shear, global buckling capacities and fatigue life of the tower structure would need to be confirmed in the detailed design process.

Illustrative Example 1

The advantageous effects of the embodiments of the present disclosure are shown in more detail in comparison to conventional towers employing a wind turbine at a top thereof.

Figure 8:
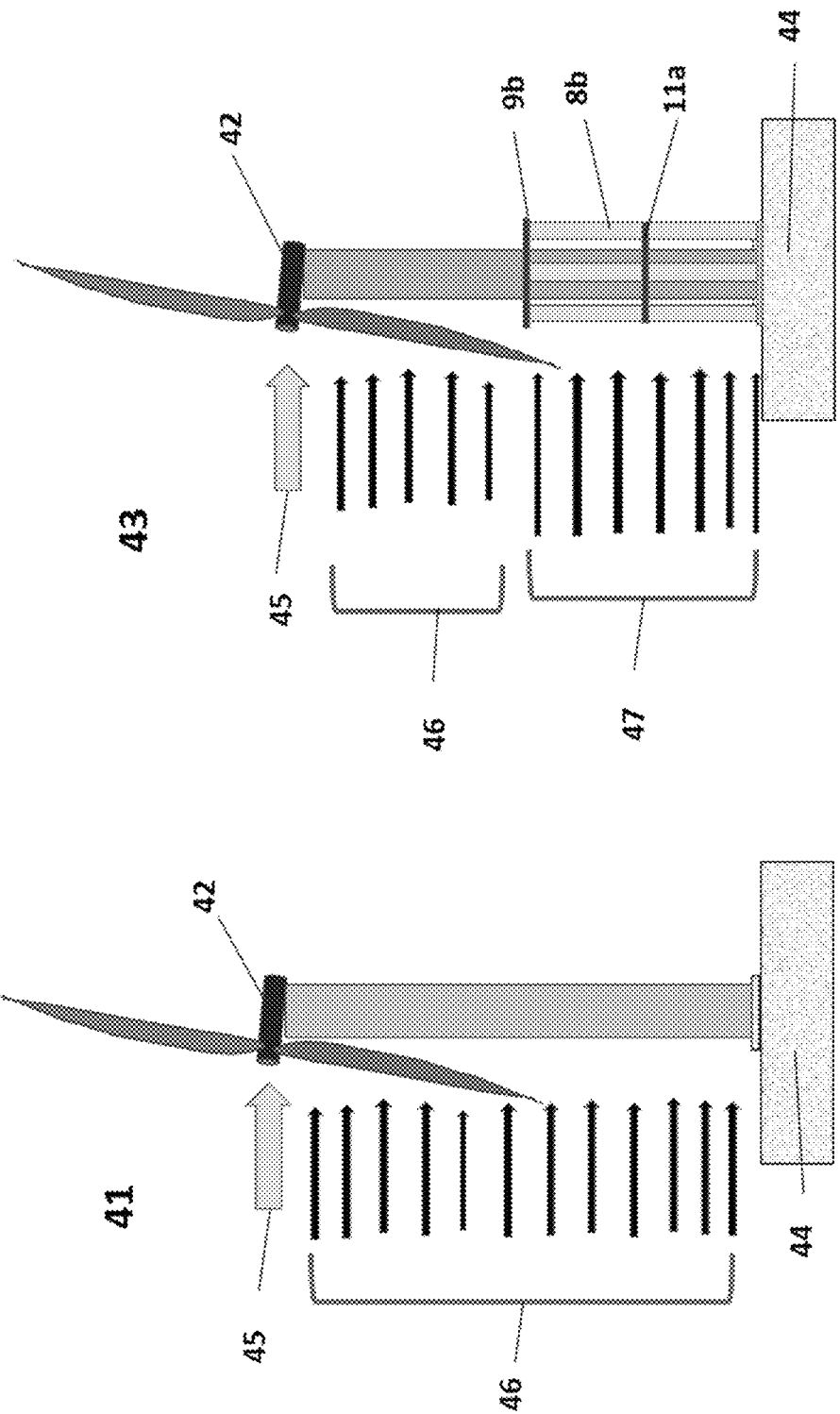
FIG. 8 illustrates an example comparison of the conventional tower and a composite tower according to an embodiment of the present disclosure.

Referring now to FIG. 8 a conventional tower 41 supporting a wind turbine RNA 42 is shown on the left, and a composite tower structure 43 according to an embodiment of the present disclosure employing the same wind turbine is shown on the right. Based on the preliminary design process provided in FIGS. 7A-7B, and described above, the following conditions are assumed for both towers to derive the results:

1. Wind turbine towers are typically linearly tapered with the diameter of the tower base being larger than the top of the tower, and the wall thickness decreasing with the tower height. However, as a simplification to show the advantageous effects of the present disclosure, the tower structure is assumed to have a uniform outer diameter (of 4.0 m) for the purpose of this illustrative example.
2. Both tower structures 41, 43 are 97.6 m tall, with the center of the wind turbine RNA 42 set at a height of 100 meters (referred to as the hub height).
3. The wind turbine RNA weight was assumed to be 350 MT for both tower designs.
4. Both tower designs are assumed to have a "fixed" connection to the foundation (i.e., no rotation or displacement at the tower base) 44.
5. The tower structures are also assumed to be "free" at the top of the tower, resulting in a simple cantilever beam model.
6. Both tower designs will be based on using 344.7 Mpa (50 KSI) steel grade with a maximum allowable stress of 206.8 Mpa (30 KSI).
7. A steel weight density of 7,500 kg/m^3 (468 LBS/Ft^3) and a modulus of elasticity of 200 Mpa (29 KSI) are assumed for both tower designs.
8. A minimum wall thickness limit of 9.5 mm (0.375 inches) and a maximum wall thickness limit of 114.3 mm (4.50 inches) will be assumed for both tower designs.
9. A uniform wind speed of 55 meters/second is assumed to act over the entire height of the tower structure.
10. While both tower structures will be subjected to dynamic loading due to the wind turbulence, the wind turbine thrust load (100 MT) 45 and the associated wind drag forces (0.8 MT/m) 46 acting on the tower will be considered as quasi-static loads.
11. A larger effective diameter (6.5 m) is assumed for the lower portion of the composite tower as a means to conservatively account for the additional drag forces acting on the vertical supports 47. This resulted in an increased drag force of 1.2 MT/m that will be applied over the lower portion of the composite tower.
12. The natural frequency of the tower will be estimated using the numerical method developed by Myklestad.

Figure 9:
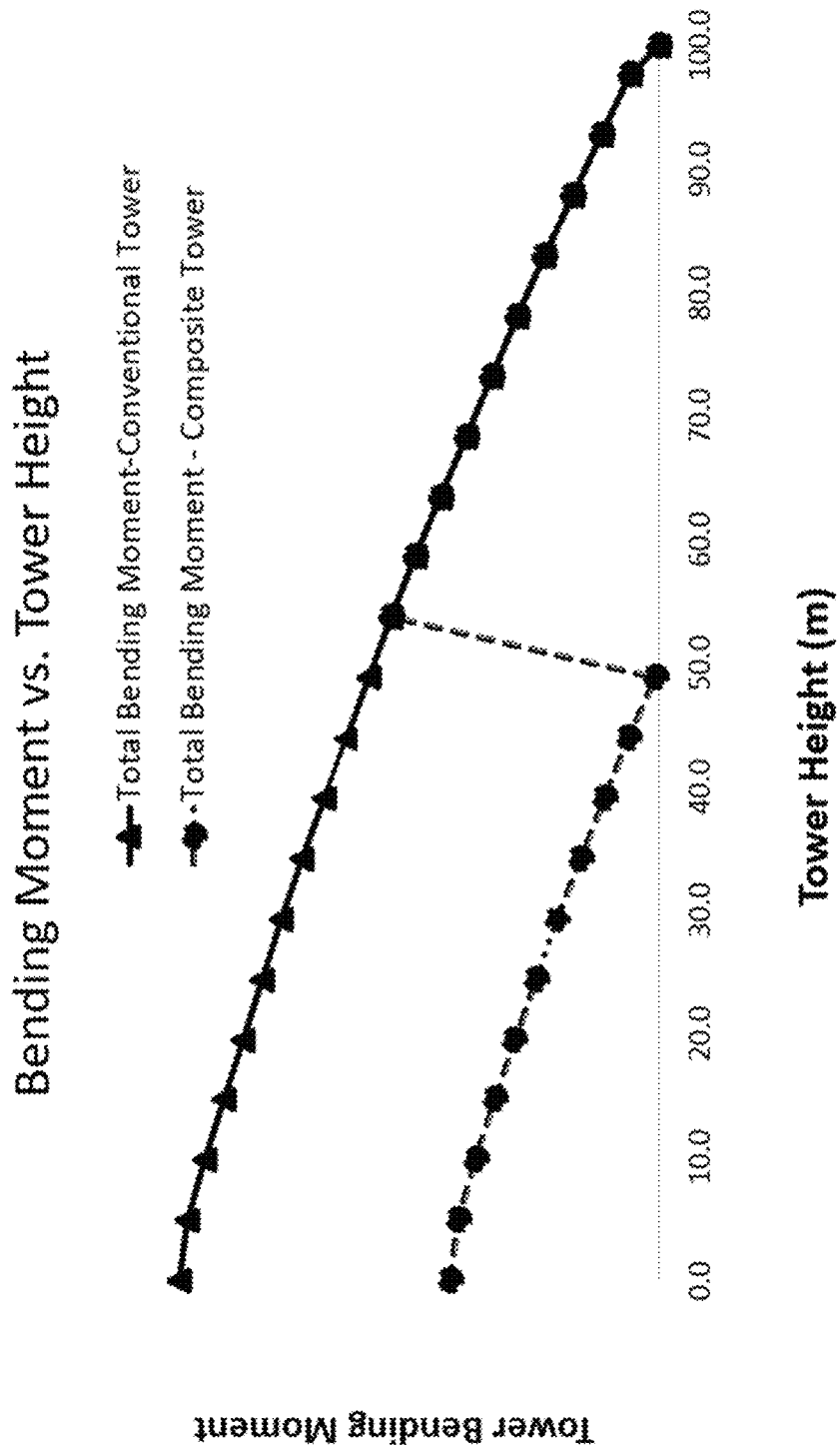
FIG. 9 is a graph showing the resulting bending moment distributions for the conventional and composite towers for the example shown in FIG. 8.

Based on the assumptions described above, the bending moment distributions, as a function of tower height, were developed for each tower design shown in FIG. 8 and are illustrated in FIG. 9.

As shown in FIG. 9, the bending moment is the same for the example conventional tower and the example composite tower of the present disclosure from the top of the tower (97.6 m) to the middle portion of the tower body (~50 m). However, the application of the counter moment associated with the composite tower significantly reduces the bending moment distribution below the counter moment application (at the support structure) to the base of the composite tower (~50 m and below).

Figure 10:
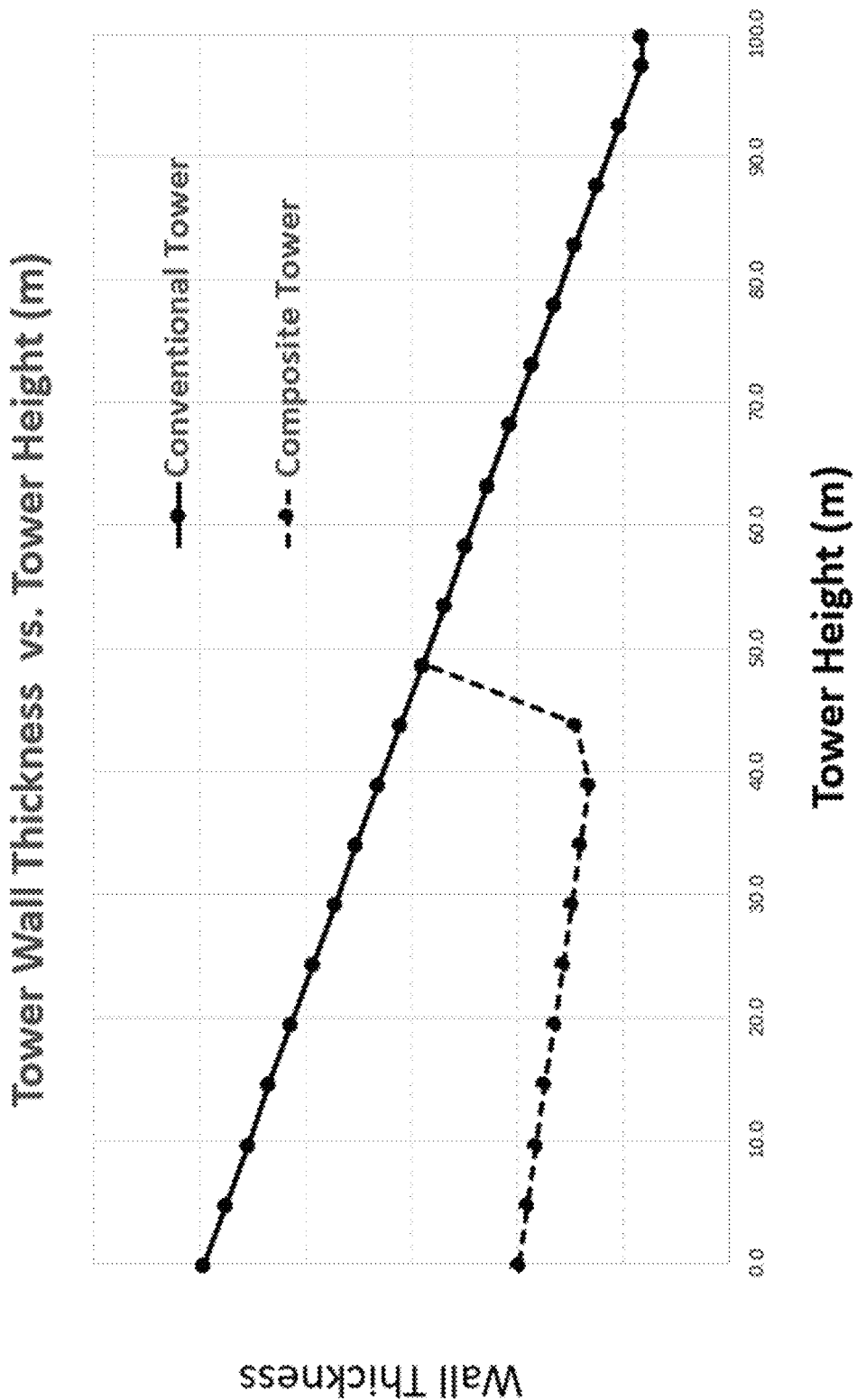
FIG. 10 is a graph showing the resulting wall thickness distributions for the conventional and composite towers of FIG. 8 which resist the bending moments shown in FIG. 9.

Using the bending moment distributions shown in FIG. 9, the required tower wall thickness was determined for each tower design example to achieve bending stresses less than the allowable stress. The conventional tower design assumed a linear taper of wall thickness as shown in FIG. 10. The composite tower design assumed an identical wall thickness taper for the upper tower section (between ~50 m and 97.6 m of tower height) but introduces a different (reduced) wall thickness for the lower portion of the tower to match the reduced bending moment distribution, also shown in FIG. 10. Once the tower wall thickness distribution was established for each tower design, the first mode natural frequencies were estimated. The resulting natural frequencies were nearly identical at approximately 0.7 Hz. These frequencies were well above both the assumed rotor frequency (0.16 Hz) and the blade frequency (0.48 Hz), thus achieving the "stiff-stiff" tower design condition described previously.

The composite tower in this example includes four, thin-walled tubular (pipe-type) vertical supports that are connected at the mid-height (at the support structure) of the tower body. These vertical supports are spaced 90 degrees apart around the tower circumference. Each vertical support has a diameter of 762 mm (30.0 inches), with a wall thickness of 25.4 mm (1.0 inches). To calculate the buckling capacity of each vertical support, the top and bottom ends of the vertical support were conservatively assumed to be pinned (vs. fixed) at both the support structure and at the pre-installed pile foundation. One intermediate guide structure was also assumed to be located approximately one quarter of the height of the tower (i.e., mid-way between the support structure and the base of the tower body). A steel grade of 344.7 Mpa (50 KSI) was assumed for the vertical supports, giving an allowable stress of 206.8 Mpa (30 KSI). The vertical supports were designed to limit the rotation at the mid-height of the tower body to less than 1.0 degrees, resulting in the vertical supports either stretching or compressing 53.3 mm (~2.1 inches). The tower rotational limit was considered reasonable, as the wind turbine would not be rotating (operational) at this wind speed, and in fact would be actually placed in the parked (locked) condition. However, the mid-height tower rotation limit can be reduced (or increased) by adjusting the number, diameter, and wall thickness of the vertical supports.

Results from the Example

The key results from the Illustrative Example 1 tower design comparison cases are summarized in Table 1.

TABLE 1

Key Tower Design Results

| | Conventional Tower Design | Composite Tower Design |
|---|---|---|
| Tower Height | 97.6 m | 97.6 m |
| Tower Diameter - Base/Top | 4.0 m/4.0 m | 4.0 m/4.0 m |
| Tower Structure Weight | 337 MT | 231 MT (*) |
| Vertical Support Weight (Total) | 0 MT | 82 MT |
| Total Tower/Vertical Support Weight | 337 MT | 313 MT (*) |
| Vertical Support - Number/Diameter/Thickness | Not Applicable | 4/762 mm/25.4 mm |
| Wind Turbine RNA Weight (Total) | 350 MT | 350 MT |
| Wind Turbine Thrust | 100 MT | 100 MT |
| Wind Speed-Uniformly Applied | 55.0 m/s | 55.0 m/s |
| Rotor Frequency | 0.16 Hz | 0.16 Hz |
| Blade Frequency (3 Blade Turbine) | 0.48 HZ | 0.48 HZ |
| Tower Natural Frequency (First Mode) | 0.67 Hz | 0.69 Hz |

(*) Includes the Structural Supports and Intermediate Guide Structures

Referring to Table 1, the total steel weight savings associated with the composite tower design was 24 MT, or ~7% of the conventional tower design. However, the tower structure weight of the composite tower was 106 MT (or 31%) less than the structural weight for the conventional tower design. Although this weight savings is offset by the total vertical support steel weight (of 82 MT), the overall cost to fabricate the composite tower would be significantly less than the corresponding conventional tower design which support the same wind turbine. This is due to the higher fabrication costs (in $/MT) associated with the tower structure compared to the fabrication costs ($/MT) of the vertical supports.

Illustrative Example 2

Figure 11:
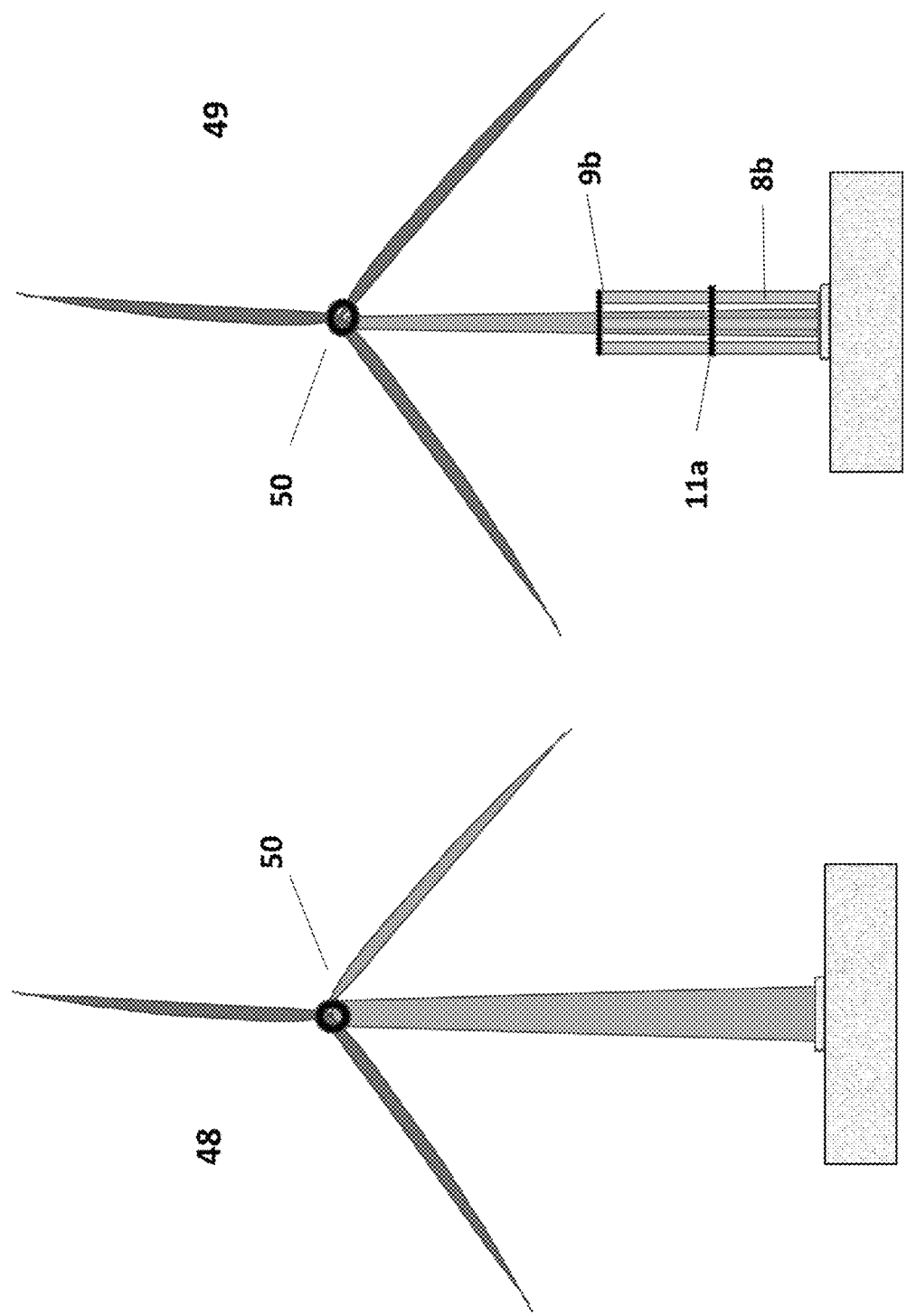
FIG. 11 provides illustrations of a conventional tower and a composite tower according to an embodiment of the present disclosure for a representative 5.0 Mega-Watt (MW) wind turbine application.

Conventional and composite tower designs were developed for a representative 5.0 MW wind turbine application for a range of wind turbine heights from 80 m to 160 m. These tower designs were based on the preliminary design process provided in FIGS. 7A-7B. FIG. 11 illustrates the conventional tower design 48 (shown on the left) and composite tower design 49 (shown on the right) of the present disclosure for the 5.0 MW wind turbine application 50.

It has been previously demonstrated that an overall structural weight savings can be achieved for the conventional towers by linearly decreasing (or tapering of) the tower diameter from the tower's base to its top. Therefore, a linear tapering of both the conventional tower and composite tower designs were assumed in this example. In addition, the key input parameters assumed in the above Example 1, including the RNA weight, turbine thrust, design wind speed, (etc.) were assumed in this example.

For the composite tower designs in this example, four equally spaced thin-walled tubular vertical supports (8b) and support structures (9b) were assumed around the circumference of the tower, as illustrated in FIGS. 4A-D. A single intermediate guide structure (11a) was also assumed, also illustrated in FIG. 4A and FIG. 4C.

The composite tower's base and top diameters were maintained at 4.3 m and 3.0 m, respectively, over the entire range of heights between 80 m and 160 m. However, for the conventional tower designs, the base and top diameters were adjusted at each wind turbine height to meet the allowable stress levels while maintaining the wall thickness under 114 mm (4.5 inches). This resulted in the conventional tower's base diameter ranging from 4.3 m (at the 80 m height) to 10.0 m (at the 160 m height). The corresponding top dimensions ranged from 3.0 m (at the 80 m height) to 5.1 m (at the 160 m height).

Figure 12:
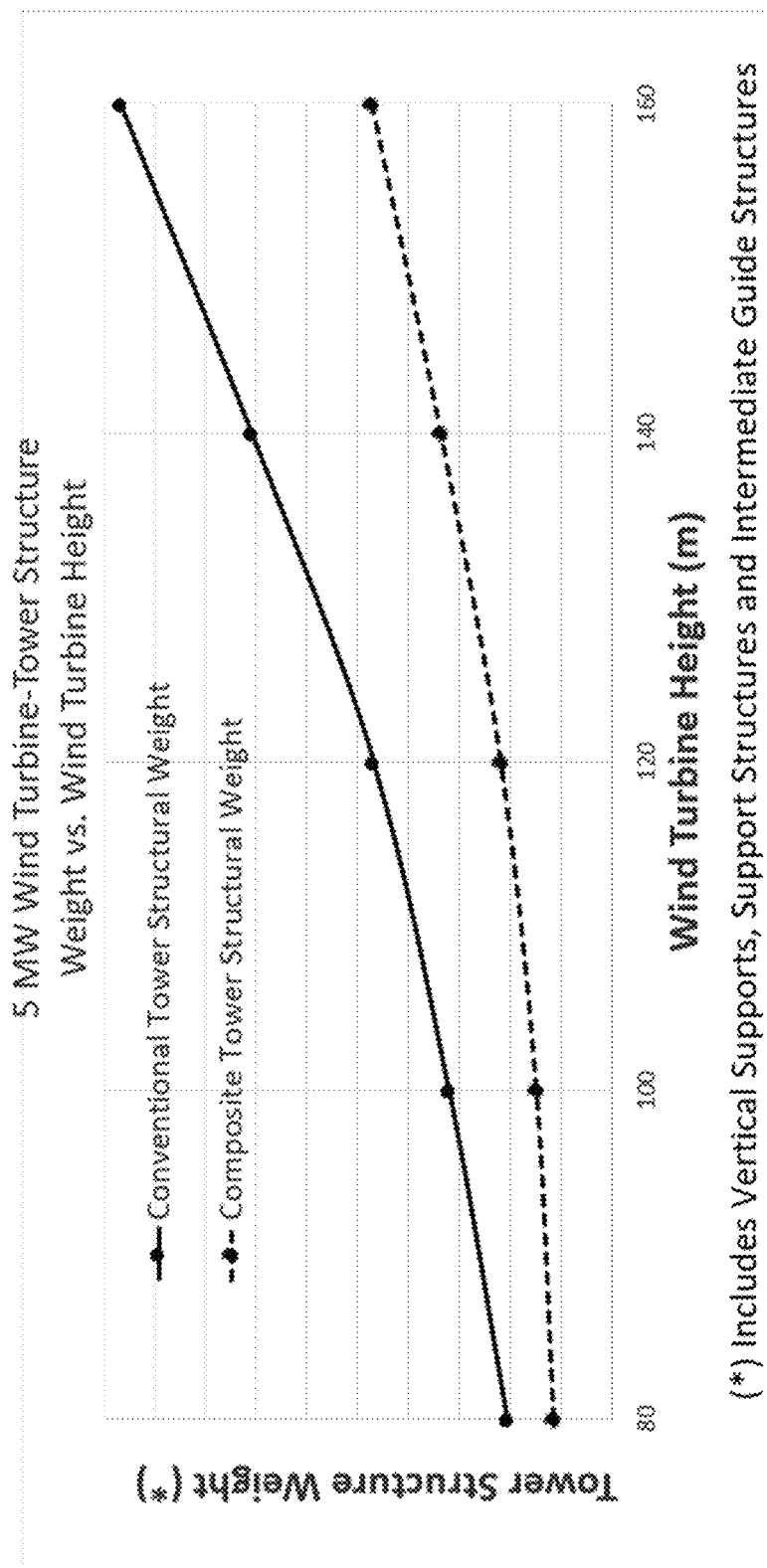
FIG. 12 is a graph that illustrates the total tower and vertical support structural weights for a conventional tower and a composite tower according to an embodiment of the present disclosure for wind turbine heights from 80 m to 160 m.

FIG. 12 illustrates a graph detailing the total tower structural weight (including the vertical supports, support structures and intermediate guide structures) for both the conventional and composite tower designs over the range of wind turbine heights from 80 m to 160 m.

As shown in FIG. 12, the composite tower designs of the present disclosure have less total structural weight (including the vertical supports, support structures and intermediate guide structures) than the conventional tower designs for the entire range of tower height, with the composite tower's structural weight savings increasing with increasing tower heights.

Thus, it has been demonstrated that the present disclosure provides a monolithic composite tower structures which for increasing tower heights have significantly reduced total structural weights compared to the conventional tower. Further, the composite tower can be designed with tower diameters and wall thicknesses within reasonable transportation and fabrication limits. The composite tower structure of the present disclosure enables more efficient fabrication and transportation when compared to the conventional tower structure. Further, the present disclosure provides a method of designing and assembling/constructing the composite tower structure.

Exemplary embodiments have been disclosed herein and in the drawings. Although specific terms have been used herein, the terms are only used for the purpose of describing the present disclosure and are not intended to limit meanings or limit the scope of the present disclosure described in the claims below. Therefore, those of ordinary skill in the art should understand that various modifications and other equivalent embodiments are possible. Accordingly, the actual technical scope of the present disclosure should be defined by the technical idea of the attached claims.

The use of the terms "a" and "an" and "the" and similar referents in the context of describing the disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Certain embodiments of this disclosure are described herein, including the best mode known to the inventor for carrying out the disclosure. It should be understood that the illustrated embodiments are exemplary only and should not be taken as limiting the scope of the disclosure.

The invention claimed is:

1. A tower structure comprising:
 a tapered tower body;
 a foundation to which a bottom end of the tower body is fixed;
 a plurality of vertical supports fixed around a perimeter of the tower body;
 a support structure connecting a top portion of each of the plurality of vertical supports to the tower body; and
 one or more intermediate guide structures connected to the tower body and supporting a middle portion of the plurality of vertical supports,
 wherein each of the one or more intermediate guide structures comprises a plurality of ring guides, each ring guide surrounding and accommodating the middle portion of a corresponding vertical support, and
 wherein the each ring guide laterally restrains the corresponding vertical support but is not fixedly connected thereto.

2. The tower structure of claim 1, wherein the tower body is hollow and has a wall having a thickness which varies along a height of the tower body, and the thickness of the tower body has a step on an inner surface of the wall at a height corresponding to a connection point of the support structure and the tower body.

3. The tower structure of claim 2, wherein the thickness of the wall decreases from the bottom end of the tower body to a height corresponding to a connection point of the support structure and the tower body, increases with the step on the inner surface of the wall, and decreases from the height corresponding to the connection point of the support structure and the tower body to a top end of the tower body.

4. The tower structure of claim 1, wherein the support structure connects the top portion of the vertical supports at mid-height of the tower body.

5. The tower structure of claim 1, wherein the each of the one or more intermediate guide structures comprises a plurality of extensions radially extending from the tower body, and
 wherein each of the plurality of extensions comprises the ring guide disposed at a distal end thereof which surrounds and accommodates the middle portion of the corresponding vertical support.

6. The tower structure of claim 5, wherein the support structure comprises a plurality of extended plates radially extending from the tower body, and
 wherein each of the plurality of extended plates comprises a through hole disposed at a distal end thereof which accommodates and fixes the top portion of a corresponding vertical support.

7. The tower structure of claim 1, wherein each of the one or more intermediate guide structures comprises a structural support ring, and
 wherein the structural support ring connects to the tower body at a center thereof and comprises the plurality of ring guides surrounding and accommodating the middle portion of the plurality of vertical supports.

8. The tower structure of claim 7, wherein the support structure comprises a structural support ring, and
 wherein the structural support ring of the support structure connects to the tower body at a center thereof and comprises a plurality of through holes accommodating and fixing the top portion of the plurality of vertical supports.

9. The tower structure of claim 1, wherein the support structure comprises a plurality of extended plates radially extending from the tower body, and
 wherein each of the plurality of extended plates comprises a through hole disposed at a distal end thereof which accommodates and fixes the top portion of a corresponding vertical support.

10. The tower structure of claim 1, wherein the support structure comprises a structural support ring, and
 wherein the structural support ring connects to the tower body at a center thereof and comprises a plurality of through holes accommodating and fixing the top portion of the plurality of vertical supports.

11. The tower structure of claim 1, wherein the foundation includes a plurality of piles securing the foundation to a ground, and
 wherein a bottom end of the each of the plurality of vertical supports are fixed to the foundation.

12. The tower structure of claim 1, wherein a bottom end of the each of the plurality of vertical supports are fixed to the foundation or a ground by a plurality of piles.

13. The tower structure of claim 1, wherein the plurality of vertical structures is symmetrically fixed around the perimeter of the tower body and is selected from one among thin-walled tubular sections, thick-walled pipes, threaded pipe sections, pre-tensioned solid rods, and pre-tensioned cables.

* * * * *